United States Patent [19]

Mazurek et al.

[11] Patent Number: 5,527,578
[45] Date of Patent: Jun. 18, 1996

[54] RADIATION CURABLE VINYL/SILICONE RELEASE COATING

[75] Inventors: Mieczyslaw H. Mazurek, Roseville; Steven S. Kantner, St. Paul; Albert I. Everaerts, Oakdale, all of Minn.

[73] Assignee: Minnesota Mining and Manufacturing Company, Saint Paul, Minn.

[21] Appl. No.: 304,424

[22] Filed: Sep. 12, 1994

Related U.S. Application Data

[63] Continuation of Ser. No. 117,549, Sep. 7, 1993, abandoned, which is a continuation of Ser. No. 672,386, Mar. 20, 1991, abandoned.

[51] Int. Cl.$^6$ ............................ A61F 13/02; B32B 9/04
[52] U.S. Cl. .................... 428/41.8; 428/343; 428/345; 428/355; 428/446; 428/447; 427/387; 525/474; 525/477; 525/479; 528/21; 528/22; 528/32; 528/38; 528/41; 528/44
[58] Field of Search ........................... 428/40, 41, 42, 428/343, 345, 355, 446, 447; 427/54.3, 387; 525/474, 477, 478; 528/21, 22, 32, 38, 41, 44

[56] References Cited

U.S. PATENT DOCUMENTS

| | | | |
|---|---|---|---|
| Re. 24,906 | 12/1960 | Ulrich | 206/59 |
| 3,577,264 | 4/1971 | Nordstrom | 428/334 |
| 3,878,263 | 4/1975 | Martin | 528/32 |
| 4,016,333 | 5/1977 | Gaske et al. | 428/447 |
| 4,070,526 | 1/1978 | Colquhoun et al. | 428/447 |
| 4,117,028 | 9/1978 | Hahn | 525/90 |

(List continued on next page.)

FOREIGN PATENT DOCUMENTS

| | | | |
|---|---|---|---|
| 0058909 | 2/1982 | European Pat. Off. | C09D 3/82 |
| 0159683 | 4/1985 | European Pat. Off. | C09D 3/22 |
| 0152179 | 8/1985 | European Pat. Off. | C08L 83/07 |
| 0170219 | 2/1986 | European Pat. Off. | A61C 9/00 |
| 0176481 | 4/1986 | European Pat. Off. | C08G 77/20 |
| 0210041 | 1/1987 | European Pat. Off. | C08F 291/00 |
| 0278618 | 8/1988 | European Pat. Off. | C08F 230/08 |
| 4,130,708 | 12/1978 | Friedlander et al. | 528/28 |
| 4,136,250 | 1/1979 | Mueller et al. | 528/29 |
| 4,153,641 | 5/1979 | Deichert et al. | 526/264 |
| 4,158,617 | 6/1979 | Eldred | 522/55 |
| 4,181,725 | 1/1980 | Martens et al. | 514/297 |
| 4,201,808 | 5/1980 | Cully | 428/40 |

(List continued on next page.)

OTHER PUBLICATIONS

X. Yu, S. L. Cooper, et al., *J. Appl. Poly. Sci.*, 30, 2115 (1985).
U.S. Application Serial No. 07/792,437, Radiation–Curable Silicone Elastomers and Pressure–Sensitive Adhesives.
Silicones, *Enc. of Polym. Sci. & Eng.*, 2nd Ed., vol. 15, pp. 296–297.
Silicones, *Enc. of Polym. Sci. & Eng.*, 1st Ed., pp. 541, 544–552.
U.S. Application Serial No. 07/411,410 "Radiation–Curable Silicone Elastomers and Pressure Sensitive Adhesives".
Bull. Chem. Soc. Japan 41(10) 2521 (1968).
*Pressure Sensitive Tape Council* Publication PSTC–1 (Nov. 1975).

*Primary Examiner*—Leszek Kiliman
*Attorney, Agent, or Firm*—Gary L. Griswold; Walter N. Kirn; Janice L. Dowdall

[57] ABSTRACT

The invention relates to a radiation curable release coating composition comprising:

(a) from about 0.05 to about 25 percent by weight of polymer selected from the group consisting of polymers falling within the general formula:

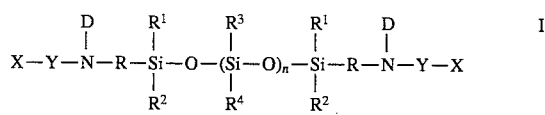

and mixtures thereof, wherein:

X are monovalent moieties having ethylenic unsaturation which can be the same or different;

Y are divalent linking groups which can be the same or different;

D are monovalent moieties which can be the same or different selected from the group consisting of hydrogen, an alkyl group of 1 to about 10 carbon atoms, aryl, and substituted aryl;

R are divalent hydrocarbon groups which can be the same or different;

$R^1$ are monovalent moieties which can be the same or different selected from the group consisting of alkyl, substituted alkyl, aryl, and substituted aryl;

$R^2$ are monovalent moieties which can be the same or different selected from the group consisting of alkyl, substituted alkyl, aryl, and substituted aryl;

$R^3$ are monovalent moieties which can be the same or different selected from the group consisting of alkyl, substituted alkyl, vinyl, aryl, and substituted aryl;

$R^4$ are monovalent moieties which can be the same or different selected from the group consisting of alkyl, substituted alkyl, vinyl, aryl, and substituted aryl; and n is an integer of about 25 to about 750;

(b) from about 5 to about 60 percent by weight of one or more free radically polymerizable multifunctional vinyl monomers copolymerizable with said polymer; and (c) from about 25 to about 95 percent by weight of one or more free radically polymerizable monofunctional vinyl monomers copolymerizable with said polymer;

wherein said weight percentages are based upon the total weight of the radiation curable release coating composition.

The invention also relates to substrates coated with the release coating.

24 Claims, No Drawings

U.S. PATENT DOCUMENTS

| | | | |
|---|---|---|---|
| 4,223,067 | 9/1980 | Levens | 428/313.9 |
| 4,276,402 | 6/1981 | Chromecek et al. | 526/264 |
| 4,293,397 | 10/1981 | Sato et al. | 522/55 |
| 4,309,520 | 1/1982 | Blizzard | 525/477 |
| 4,330,590 | 5/1982 | Vesley | 428/336 |
| 4,348,454 | 9/1982 | Eckberg | 428/334 |
| 4,364,972 | 12/1982 | Moon | 427/516 |
| 4,369,300 | 1/1983 | Carter et al. | 528/28 |
| 4,391,687 | 7/1983 | Vesley | 525/330.5 |
| 4,477,326 | 10/1984 | Lin | 522/21 |
| 4,477,548 | 10/1984 | Harasta et al. | 430/14 |
| 4,503,208 | 3/1985 | Lin et al. | 528/15 |
| 4,504,629 | 3/1985 | Lien et al. | 525/288 |
| 4,528,081 | 7/1985 | Lien et al. | 522/39 |
| 4,554,339 | 11/1985 | Hockemeyer et al. | 528/26 |
| 4,558,082 | 12/1985 | Eckberg | 524/104 |
| 4,558,111 | 12/1985 | Tolentino | 528/26 |
| 4,561,950 | 12/1985 | Leo | 522/91 |
| 4,563,539 | 1/1986 | Gornowicz et al. | 556/421 |
| 4,568,566 | 2/1986 | Tolentino | 427/516 |
| 4,575,545 | 3/1986 | Nakos et al. | 526/242 |
| 4,575,546 | 3/1986 | Klemarczyk et al. | 526/245 |
| 4,576,999 | 3/1986 | Eckberg | 525/476 |
| 4,584,355 | 4/1986 | Blizzard et al. | 525/477 |
| 4,585,836 | 4/1986 | Homan et al. | 525/477 |
| 4,587,276 | 5/1986 | Lien et al. | 522/34 |
| 4,591,622 | 5/1986 | Blizzard et al. | 525/477 |
| 4,595,471 | 6/1986 | Preiner et al. | 522/29 |
| 4,597,987 | 7/1986 | Hockemeyer et al. | 427/513 |
| 4,603,086 | 7/1986 | Fujii et al. | 428/447 |
| 4,605,933 | 8/1986 | Griswold et al. | 343/700 MS |
| 4,608,270 | 8/1986 | Varaprath | 427/503 |
| 4,640,967 | 2/1987 | Eckberg | 528/26 |
| 4,675,346 | 6/1987 | Lin et al. | 522/39 |
| 4,678,846 | 7/1987 | Weitemeyer et al. | 525/477 |
| 4,693,776 | 9/1987 | Krampe et al. | 156/327 |
| 4,698,406 | 10/1987 | Lo et al. | 528/12 |
| 4,728,571 | 3/1988 | Clements | 428/352 |
| 4,748,043 | 5/1988 | Seaver et al. | 427/30 |
| 4,766,185 | 8/1988 | Ryntz et al. | 525/479 |
| 4,774,297 | 9/1988 | Murakami et al. | 525/478 |
| 4,777,276 | 10/1988 | Rasmussen et al. | 556/419 |
| 4,783,490 | 11/1988 | Eckberg et al. | 522/99 |
| 4,791,163 | 12/1988 | Traver et al. | 524/506 |
| 4,831,070 | 5/1989 | McInally et al. | 524/267 |
| 4,831,080 | 5/1989 | Blizzard et al. | 525/100 |
| 4,839,206 | 6/1989 | Waldenberger | 428/40 |
| 4,898,920 | 2/1990 | Lee et al. | 525/477 |
| 4,906,695 | 3/1990 | Blizzard et al. | 525/100 |
| 4,943,613 | 7/1990 | Arai et al. | 524/773 |
| 4,943,620 | 7/1990 | Gomyo et al. | 525/474 |
| 5,091,483 | 2/1992 | Mazurek | 525/477 |

FOREIGN PATENT DOCUMENTS

| | | | |
|---|---|---|---|
| 0280248 | 8/1988 | European Pat. Off. | B65D 81/20 |
| 0289928 | 11/1988 | European Pat. Off. | C09J 3/14 |
| 0308216 | 3/1989 | European Pat. Off. | C09J 7/02 |
| 0332400 | 8/1989 | European Pat. Off. | C08L 83/14 |
| 0378420 | 7/1990 | European Pat. Off. | C08L 83/08 |
| 2507196 | 12/1982 | France | C09J 7/02 |
| 2596676 | 10/1987 | France | B05D 5/10 |
| 56-43352 | 4/1981 | Japan | C08L 83/04 |
| 60-26065 | 2/1985 | Japan | C09D 3/82 |
| 60-104158 | 6/1985 | Japan | C08L 83/07 |
| 60-115025 | 6/1985 | Japan | G11B 5/72 |
| 60-190427 | 7/1985 | Japan . | |
| 61-57355 | 12/1986 | Japan | B41J 3/20 |
| 62-4771 | 1/1987 | Japan | C09J 7/02 |
| 63-291971 | 11/1988 | Japan | C09J 3/14 |
| 1-245078 | 9/1989 | Japan | C09J 7/02 |
| 1-245079 | 9/1989 | Japan | C09J 7/02 |
| 2-1785 | 1/1990 | Japan | C09J 133/06 |
| 1323869 | 7/1973 | United Kingdom | C08G 47/02 |
| 2039287 | 8/1980 | United Kingdom | C08G 77/04 |
| 2109390 | 6/1983 | United Kingdom | C08G 77/26 |
| WO88/07931 | 10/1988 | WIPO . | |
| WO90/10028 | 9/1990 | WIPO | C08G 77/20 |

5,527,578

RADIATION CURABLE VINYL/SILICONE RELEASE COATING

This is a continuation of application Ser. No. 08/117,549 filed Sep. 7, 1993 abandoned, which is a continuation of U.S. Ser. No. 07/672,386 filed Mar. 20, 1991, now abandoned.

FIELD OF THE INVENTION

This invention relates to a radiation curable vinyl-silicone release coating composition, to a vinyl-silicone release coating, and to substrates coated with the release coating.

BACKGROUND OF THE INVENTION

Polymeric coatings having specific release properties toward adhesives are widely used. Silicones such as polydimethylsiloxanes, polymers containing predominantly dimethylsiloxane units, are frequently employed as release coatings for products such as labels or large adhesive-coated sheets sold in other than roll form. Notwithstanding a relatively high cost, such polymers are used for these applications because of their capability of providing coatings of very low release values, e.g., in the range 0.4–1.6N/100 mm width. The term "release value" refers to the amount of force required to peel a strip of pressure-sensitive adhesive tape from a surface.

Polydimethylsiloxanes are less useful, however, as release coatings on the back surface of adhesive tape, because their low release force can cause roll instability and handling problems. Such a coating on the back surface of a tape is often referred to as a low adhesion backsize or LAB. LABs for tapes in roll form ideally exhibit release values toward the adhesive in the range of about 6–35N/100 mm width. Polymers with higher release values make it increasingly difficult to use the tape, and delamination of the adhesive from the substrate often can result. Many non-silicone polymers, e.g., certain types of polyurethanes, find use as low adhesion backsizes for pressure sensitive adhesive tapes because of their much higher release value than that of the polydimethysiloxanes, typically greater than 20N/100 mm width.

For products such as tapes and liners, coatings having specific release properties toward adhesives, which are intermediate between those of the polydimethysiloxanes and conventionally used non-silicone LAB coatings have been highly desired. U.S. Pat. No. 4,728,571 (Clemens et al.) (assigned to the assignee of the present case) provides such coatings through use of polysiloxane-grafted vinyl copolymers. Controlled release is provided over a broad range of values via variation in the molecular weight and the number of polysiloxane grafts. Since the polysiloxane is chemically anchored to the backbone of the copolymers, such coatings avoid the migration problems common in prior art systems, which result in unstable release properties or in adhesive contamination. Also, since the polysiloxane constitutes only a minor weight fraction of the coating (even at low release values suitable for release liner applications), these copolymer compositions provide a potential cost savings over conventional 100% silicone release compositions and numerous blends. However, these coatings are solvent-borne.

Rising energy costs and concern over both environmental pollution and hazards to worker health have contributed to a need for development of solvent-free (or at least high solids), radiation-curable release coatings. Thus, a solventless, radiation-curable release coating composition capable of providing controlled release throughout the intermediate region suitable for LABs is highly desired. Ideally, from a cost perspective, such a composition should be low in silicone content. Most systems which have been developed, however, contain fairly high levels of silicone.

U.S. Pat. No. 4,678,846 (Weitemeyer et al.) describes acrylate or methacrylate ester modified organopolysiloxane mixtures, which can be used by themselves or in admixture with other unsaturated compounds as radiation-curable coating compositions to obtain "good adhesive properties towards adhesives."

EP 58909 (Herbefts GMBH), Published Sep. 1, 1982, discloses a radiation-curable composition containing liquid polyorganosiloxane having unsaturated groups, photosensitizer, and, optionally, vinyl monomer. The composition is used for the production of release coatings and is especially useful for coating paper.

U.S. Pat. No. 4,558,082 (Eckberg) describes photocurable acrylated silicone polymers prepared by reacting limoneneoxide-functional silicones with acrylic acid or a substituted acrylic acid in the presence of a catalyst. A preferred use of the compositions is as release coatings for paper, and it is disclosed that the compositions exhibit improved anchorage to substrates, such as supercalendered kraft paper, when up to 20% by weight of N-vinylpyrrolidone is included.

U.S. Pat. No. 4,606,933 (Griswold et al.) describes radiation-polymerizable acrylate-functional organopolysiloxanes and their use as release coatings. It is stated that it may be desirable to add a diluent to the compositions to aid in their application to a substrate. The diluent, preferably a reactive diluent, such as an acrylate ester, can be employed at levels up to about 30% by weight of the radiation-curable composition.

U.S. Pat. No. 4,783,490 (Eckberg et al.) discloses UV-curable compositions comprising mercapto-substituted silicon compounds, reactive co-compounds such as multifunctional acrylates, and photoinitiator. Reactive diluents, such as monofunctional acrylates, may optionally be added to control viscosity, although generally it is not desirable to add more than about 25% by weight. The compositions may be formulated for application to paper substrates as a release coating.

EP 159683 (DeSoto Inc.), Published Oct. 30, 1985, describes an electron beam-curable liquid release coating composition comprising from 60 to 95 parts functionalized organopolysiloxane, e.g., acrylated organopolysiloxane, from 3 to 25 parts of a polyester, e.g., a multifunctional acrylate, and from 1 to 10 parts acid, e.g., acrylic acid. The composition can optionally further include from 1 to 15 parts of a monoacrylate or monomethacrylate monomer to adjust the hardness.

U.S. Pat. No. 4,608,270 (Varaprath) discloses coating compositions comprising polydiorganosiloxanes which contain one or more acryloylamino-substituted hydrocarbon radicals.

These compositions are radiation-polymerizable to form release coatings and may optionally include polymerizable vinyl monomers.

U.S. Pat. Nos. 4,576,999 and 4,640,967 (Eckberg) describe epoxy- and/or acrylic-functional polysiloxanes which, when combined with appropriate catalysts, form ultraviolet radiation-curable release coating compositions. It is stated that cure performance and substrate adhesion may be enhanced by the addition of up to 10 parts of an aliphatic-epoxy monomer for every 10 parts epoxysilicone fluid.

U.S. Pat. No. 4,070,526 (Colquhoun et al.) discloses radiation-curable compositions comprising mercaptoalkyl-substituted polydiorganosiloxane fluid, from about 1 to 50 parts by weight vinyl monomer (per 100 parts of the fluid), and, optionally, a methylvinylpolysiloxane. Upon curing, controllably variable release of adhesives is said to be provided. Release data for compositions containing greater than 50 parts of vinyl monomer (see Table I of U.S. Pat. No. 4,070,526) indicates that release Is not reliably obtained at these higher levels, i.e., at lower levels of silicone.

A few systems have been developed which reliably provide release at low silicone levels. However, these systems suffer from the disadvantage of being inhomogeneous mixtures which, although acceptable for paper substrates, are unsuitable for use on polymeric films due to problems with dewetting. In addition, such inhomogeneous mixtures are unsuitable for use in an electrospray coating process due to problems with phase separation.

U.S. Pat. No. 4,016,333 (Gaske et al.) describes radiation-polymerizable release coating compositions (typically for paper substrates) in the form of nonaqueous emulsions of from 2 to about 50 weight percent of a liquid alkyl hydrogen polysiloxane in a radiation-polymerizable polyethylenically unsaturated liquid, preferably a polyacrylate. It is stated that an emulsifying agent can be used to promote long-term emulsion stability and that the emulsion can also be agitated as it is applied.

U.S. Pat. No. 4,201,808 (Cully et al.) discloses radiation-curable release coating compositions, most commonly for paper substrates, comprising from about 10 to 90 weight percent (based on the total weight of the composition) of an organopolysiloxane containing an average of at least one acryloxy and/or methacryloxy group per molecule, from about 90 to 10 weight percent of a low molecular weight acrylated polyol crosslinking agent, and from 0 to about 10 weight percent of a photosensitizer. To adjust viscosity, the compositions can also contain from 0.01 to about 30 weight percent of a reactive diluent, such as a liquid organic monoacrylate ester. It is stated that the composition components may undergo a degree of separation during storage, making mild agitation or mixing necessary just prior to use.

WO 88/07931 (Avery), Published Oct. 20, 1988, describes tailorable, radiation-curable release surfaces formed by curing a composition which is a dispersion of a reactive silicone (reactive group-containing dimethyl siloxane polymers present in an amount of from 1 to 30% by weight of the composition) as a discontinuous phase in a continuous phase of a reactive, resin (comprising from about 50 to 100% by weight reactive oligomer and from about 50 to 0% by weight reactive monomer based on the total weight of resin). The reactive monomer, preferably a multifunctional acrylate, is used to control viscosity. The release coatings are said to achieve-preferential concentration of the silicone at the surface by the partial or total incompatibility of the silicone and the resin. The quality of release is initially poorer and is stated to increase or improve with time.

A need exists for a solventless, radiation-curable release coating composition of substantially reduced silicone content which upon curing provides controllable, reproducible levels of release in the intermediate region suitable for LABs, which wets both paper and polymeric films well and cures to firmly anchored coatings, which has utility for a broad range of PSA types, and which does not adversely affect the tack and peel properties of PSAs with which they come in contact.

A need also exists for a coating which possesses the desired level of release immediately upon curing, thus being suitable for integrated manufacture of PSA-coated labels and tapes, e.g., wherein both the PSA and release coating are coated during the same manufacturing process.

A need also exists for a radiation-curable release coating composition which is suitable for application via an electrospray coating process.

SUMMARY OF THE INVENTION

It has been discovered that these needs can be met through use of a homogeneous composition comprising small amounts of telechelic organopolysiloxanes in combination with both multifunctional and monofunctional vinyl, preferably acrylate, monomers. The organopolysiloxanes contain terminal groups which, in addition to being reactive, are also capable of intermolecular hydrogen bonding.

More specifically, this invention provides a radiation-curable release coating composition comprising (a) from about 0.05 to about 25 percent by weight of polymer selected from the group consisting of polymers falling within the general formula:

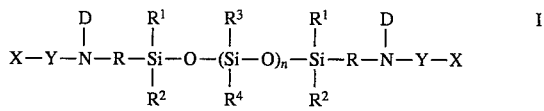

and mixtures thereof, wherein

X are monovalent-moieties having ethylenic unsaturation which cab be the same or different;

Y are divalent linking groups which can be the same or different;

D are monovalent moieties which can be the same or different selected from the group consisting of hydrogen, an alkyl group of 1 to about 10 carbon atoms, aryl, and substituted aryl;

R are divalent hydrocarbon groups which can be the same or different;

$R^1$ are monovalent moieties which can be the same or different selected from the group consisting of alkyl, substituted alkyl, aryl, and substituted aryl;

$R^2$ are monovalent moieties which can be the same or different selected from the group consisting of alkyl, substituted alkyl, aryl, and substituted aryl;

$R^3$ are monovalent moieties which can be the same or different selected from the group consisting of alkyl, substituted alkyl, vinyl, aryl, and substituted aryl;

$R^4$ are monovalent moieties which can be the same or different selected from the group consisting of alkyl, substituted alkyl, vinyl, aryl, and substituted aryl; and n is an integer of about 25 to about 750;

(b) from about 5 to about 60 percent by weight of one or more multifunctional free radically polymerizable vinyl monomers copolymerizable with said polymer; and (c) from about 25 to about 95 percent by weight of one or more monofunctional free radically polymerizable vinyl monomers copolymerizable with said polymer;

wherein said weight percentages are based upon the total weight of said radiation-curable release coating composition.

The release coating composition can further comprise an amount of free radical initiator sufficient to initiate polymerization of the composition.

This invention also provides a sheet coated on at least a portion of at least one major surface with the above-described release coating composition, as well as a cured version thereof.

DETAILED DESCRIPTION OF THE INVENTION

Telechelic silicones suitable for use in the release coating composition of the invention are similar to those represented by Formula I above and disclosed in U.S. Ser. No. 07/411,410, assigned to the assignee of the present case and incorporated by reference herein. The telechelic silicones can be prepared by reaction of an organopolysiloxane diamine, represented by the general formula

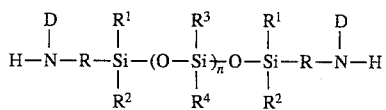

where n, R, $R^1$, $R^2$, $R^3$, $R^4$, and D are as defined above, with an electrophile having ethylenic unsaturation, X, and such other functionality that, upon reaction with the organopolysiloxane diamine, not only a terminal x group but also an amide, substituted amine, urea, or urethane moiety is provided. Examples of the types of functionality required in such electrophilic compounds include acid halide, acid anhydride, cyclic anhydride, and azlactone, each of which provides an amide moiety upon reaction with the diamine, epoxy or acrylate, each of which provides a substituted amine moiety, and isocyanate, which provides a urea moiety.

Preferably, X comprises

wherein $R^5$ is selected from the group consisting of hydrogen and —COOH and $R^6$ is selected from the group consisting of hydrogen, methyl, and —$CH_2COOH$. Most preferably, $R^5$ comprises hydrogen and $R^6$ is selected from the group consisting of hydrogen and methyl. The reaction can be carried out at a temperature of about −10° C. to about 50° C. and under atmospheric pressure by combining the diamine and the electrophile while providing appropriate mixing. A nonreactive organic solvent can be used as a diluent but is not necessary, and the two reactants can be charged into the reaction vessel in any order. Alternatively, an organopolysiloxane diamine according to Formula II above can be reacted first with a compound containing two electrophilic groups, e.g., a diisocyanate, (or with a compound such as phosgene) and the resultant product reacted in a second step with a nucleophile, e.g., an amine or an alcohol, to provide terminally difunctional silicone according to Formula I. When an alcohol such as hydroxyethyl acrylate, hydroxyethyl methacrylate, or hydroxypropyl methacrylate is utilized, the product organopolysiloxane contains urethane moieties.

The divalent linking group Y is generated upon reaction of the electrophile with the diamine and is chosen so as to activate the ethylenically unsaturated monovalent X groups towards free radical polymerization, particularly free radical copolymerization with the vinyl monomer(s) of element (b). The Y group accomplishes this by changing the electron density of X. Y is selected from, for example, the group of structures containing aromatic moieties which when bound to X yield vinyl pyridinyl or styrenic-type functionalities; structures containing carboxyl moieties which when bound to X at the oxygen side yield vinyl ester and isopropenyl ester-type functionalities; structures containing carboxamide moieties which when bound to X at the nitrogen side yield N-vinyl amide and N-isopropenyl amide-type functionalities; and structures containing carboxamide moieties which when bound to X at the carbonyl side yield acrylamide, methacrylamide, and maleimide-type functionalities. A special example of this final structure is when Y comprises a carbonyl group which depending on the nature of X can result in acrylamide, methacrylamide, beta-carboxy acrylamide, or maleimide functionality.

Organopolysiloxane diamines useful in the preparation of the telechelic silicones can be prepared in various ways. In a first method, an organopolysiloxane terminated at both chain ends with hydroxy groups, as represented by the general formula

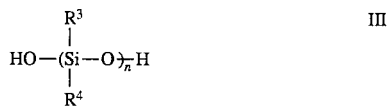

where $R^3$, $R^4$, and n are as defined above, can be subjected to a condensation reaction with a compound represented by the general formula

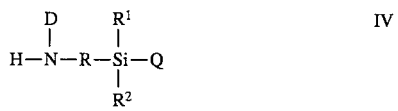

where D, R, $R^1$, and $R^2$ are as defined above and Q is a hydroxy group or a hydrolyzable group. A second method involves the reaction of a cyclic organosiloxane, represented by the general formula

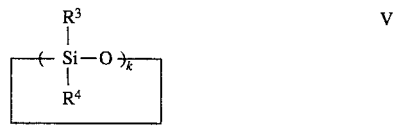

where $R^3$ and $R^4$ are as defined above and k is a positive integer of 3 to 8, with an amine functional endblocker, represented by the general formula

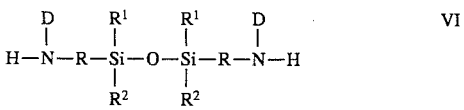

where D, R, $R^1$, and $R^2$ are as defined above, in the presence of a basic catalyst, such as tetramethylammonium hydroxide or triorganosilanolate. A third method, a modification of the second, is preferred and involves running the reaction in two stages utilizing a minimum amount of an essentially anhydrous amino alkyl functional silanolate catalyst represented by the general formula

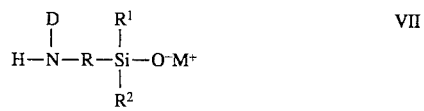

where D, R, $R^1$, and $R^2$ are as defined above and $M^+$ is a cation selected from the group consisting of $K^+$, $Na^+$, and tetraorganoammonium ion, with $N(CH_3)_4^+$ being preferred. In the first stage of the reaction, a low molecular weight organopolysiloxane diamine, represented by the general formula

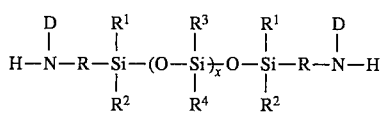   VIII where D, R, $R^1$, $R^2$, $R^3$, and $R^4$ are as defined above and x is an integer of about 4 to about 40, is prepared by reacting an amine functional disiloxane endblocker represented by Formula VI above with a cyclic organosiloxane represented by Formula V in the presence of a catalytic amount of essentially anhydrous amino alkyl functional silanolate represented by Formula VII in an inert atmosphere, such as nitrogen or argon. The preferred catalyst for use in this reaction is 3-aminopropyl dimethyl tetramethylammonium silanolate, which can be obtained as a crystalline solid from the reaction of one molar equivalent of 1,3-bis(3-aminopropyl) tetramethyldisiloxane with two molar equivalents of tetramethylammonium hydroxide pentahydrate in tetrahydrofuran under reflux, followed by drying under vacuum (0.1/mmHg) for five hours at 60° C. The amount of catalyst employed should be less than about 0.05 percent, preferably about 0,005 to about 0.03 percent, by weight, of the resultant organopolysiloxane diamine of Formula II. The reaction can be carried out in bulk at a temperature of 80°–90° C., and under these conditions is usually complete in about 0.5–2 hours, as judged by substantially complete disappearance of the endblocker in the reaction mixture as determined by vapor phase chromatography. The second stage of the reaction involves the slow addition of the remainder of the cyclic organosiloxane required to achieve the desired molecular weight. This addition is preferably carried out dropwise at such a rate that the cyclic organosiloxane is incorporated into the polymer about as fast as it is added, usually in about five to seven hours at the reaction temperature of 80°–90° C. By utilizing this two-stage method with a minimum amount of essentially anhydrous catalyst, organopolysiloxane diamines represented by Formula II above can be consistently prepared having excellent difunctionality with little contamination from monofunctional and nonfunctional polysiloxane impurities.

Preferred organopolysiloxane diamines for use in preparing the telechelic silicones of this invention are those for which n is an integer of about 50 to about 270, R is selected from the group consisting of alkylene of one to about twelve carbon atoms, alkylarylene, and arylene, $R^1$ and $R^2$ are independently selected from the group consisting of alkyl of one to about twelve carbon atoms, substituted alkyl of one to about twelve carbon atoms, aryl, and substituted aryl, $R^3$ and $R^4$ are at least 50% methyl wherein any remaining $R^3$ and $R^4$ groups are independently selected from the group consisting of alkyl of about two to about twelve carbon atoms, substituted alkyl of about two to about twelve carbon atoms, vinyl, aryl, and substituted aryl, and D is hydrogen. Such a range of molecular weights provides good release performance yet good compatibility with the vinyl monomers. Most preferably, n is an integer of about 50 to about 200, R is alkylene of one to about twelve carbon atoms and $R^1$, $R^2$, $R^3$, and $R^4$ are methyl, as polydimethylsiloxanes are the most readily available, the most inert, and provide the lowest release value for a given weight percentage of silicone.

Examples of electrophiles suitable for reaction with organopolysiloxane diamines to produce the telechelic silicones of the invention include but are not limited to isocyanatoethyl methacrylate, alkenyl azlactones such as vinyl dimethyl azlactone and isopropenyl dimethyl azlactone, m-isopropenyl-α, α-dimethyl benzyl isocyanate, glycidyl methacrylate, acryloyl ethyl carbonic anhydride, and maleic anhydride, multifunctional acrylates such as hexanediol diacrylate and trimethylolpropane triacrylate. Some electrophiles, e.g., isocyanatoethyl methacrylate, are commercially available, and others can be prepared via literature methods. Alkenyl azlactones and their preparation are described in U.S. Pat. No. 4,777,276 (Rasmussen et al.), the disclosure of which is incorporated herein by reference. Acryloyl ethyl carbonic anhydride can be prepared from ethyl chloroformate and acrylic acid by the method of R. Hatada and H. Kondo given in *Bull. Chem. Soc. Japan.* 41 (10), 2521 (1968), the disclosure of which is also incorporated herein by reference. The preparation of acryloyl ethyl carbonic anhydride according to Hatada is set forth in the Examples. Conditions for reaction of amines with multifunctional acrylates in a Michael addition reaction are described in U.S. Pat. No. 4,603,086, incorporated by reference herein. Preferred electrophiles are those which react under relatively mild conditions with the organopolysiloxane diamine and include those selected from the group consisting of isocyanatoethyl methacrylate, m-isopropenyl-α,α-dimethylbenzyl isocyanate, vinyl dimethyl azlactone, and acryloyl ethyl carbonic anhydride.

A preferred telechelic silicone for use in the composition of the invention comprises the organopolysiloxane of Formula I wherein X comprises

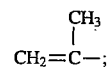

Y comprises

D=H; R comprises —$CH_2CH_2CH_2$—; and $R^1$, $R^2$, $R^3$ and $R^4$ each comprise —$CH_3$.

Another preferred organopolysiloxane comprises the organopolysiloxane of Formula I wherein X comprises $CH_2$=CH—; Y comprises

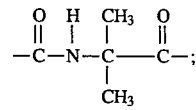

D=H; R comprises —$CH_2CH_2CH_2$—; and $R^1$, $R^2$, $R^3$ and $R^4$ each comprise —$CH_3$.

Another preferred organopolysiloxane comprises the organopolysiloxane of Formula I wherein x comprises $CH_2$=CH—, Y comprises

D=H, R comprises —$CH_2CH_2CH_2$—; and $R^1$, $R^2$, $R^3$ and $R^4$ and each comprise —$CH_3$.

Another preferred organopolysiloxane comprises the organopolysiloxane of Formula I wherein X comprises

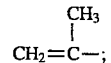

Y comprises

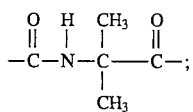

D=H; R comprises —CH$_2$CH$_2$CH$_2$—; and R$^1$, R$^2$, R$^3$ and R$^4$ each comprise —CH$_3$.

Another preferred organopolysiloxane comprises the organopolysiloxane of Formula I wherein X comprises

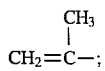

Y comprises

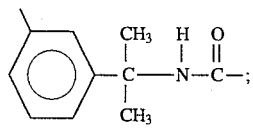

D=H; R comprises —CH$_2$CH$_2$CH$_2$—; and R$^1$, R$^2$, R$^3$, and R$^4$ each comprise —CH$_3$.

Monofunctional free radically polymerizable vinyl monomers suitable for use in the release coating composition of this invention are those which can serve as reactive diluents for the telechelic silicones, thus providing homogeneous compositions which ensure good silicone co-cure. Representative examples of such monomers include, but are not limited to those selected from the group consisting of styrene, butyl acrylate, hexyl acrylate, benzyl acrylate, cyclohexyl acrylate, isobornyl acrylate, 2-ethoxyethyl acrylate, isooctyl acrylate, isononyl acrylate, isodecyl acrylate, lauryl acrylate, 2-ethylhexyl acrylate, octadecyl acrylate, butyl methacrylate, isobornyl methacrylate, isooctyl methacrylate, tetrahydrofurfuryl acrylate, and mixtures thereof. Such monomers are known in the art, and many are commercially available. Preferred monofunctional vinyl monomers are acrylic monomers or mixtures containing predominantly (i.e., about 50 to about 100 mole percent) acrylic monomer due to their rapid cure rate. Most preferred monomers comprise monomers selected from the group consisting of acrylates of non-tertiary alcohols comprising from about four to about twelve carbon atoms, such as those selected from the group consisting of cyclohexyl acrylate, isobornyl acrylate, isooctyl acrylate, 2-ethylhexyl acrylate, lauryl acrylate, and mixtures thereof, due to their good solvating ability, high reactivity, and low volatility.

Polar monomers including but not limited to those selected from the group consisting of acrylic acid, N-vinyl pyrrolidone, hydroxyethyl acrylate, methacrylic acid, and mixtures thereof, may be included in the composition to promote adhesion of the release coating to various substrates. Such monomers are best utilized at low levels, e.g., at levels up to about 15% by weight, typically about 1 to about 15% by weight, preferably about 5 to about 10% by weight, based upon the weight of the monofunctional free radically polymerizable vinyl monomer in order to avoid reducing the homogeneity of the composition.

Representative examples of multifunctional vinyl monomers useful in the release coating composition include, but are not limited to, divinyl benzene, and acrylates, methacrylates, and beta-acryloxypropionates of 1,6-hexanediol, trimethylolpropane, 1,4-butanediol, tri- and tetraethylene glycol, pentaerythritol, their ethoxylated and propoxylated analogs, and mixtures thereof. Such monomers are included in the composition to ensure rapid cure rates and a tightly crosslinked coating. Preferred multifunctional monomers include acrylates of 1,6-hexanediol, trimethylolpropane, their ethoxylated and propoxylated analogs, and mixtures thereof, due to low cost., good reactivity, and lower silicone incompatibility.

The radiation curable release coating composition of the invention can be prepared by combining from about 0.05 to about 25 percent, preferably from about 0.1 to about 15 percent, and most preferably from about 0.2 to about 10 percent by weight, of one or more telechelic silicones represented by Formula I above, from about 5 to about 60 percent, preferably from about 5 to about 35 percent, and most preferably from about 10 to about 30 percent by weight of one or more multifunctional vinyl monomers, and from about 25 to about 95 percent, preferably about 55 to about 95 percent by weight of one or more monofunctional vinyl monomers; wherein the weight percentages are based upon the total weight of the radiation curable release coating composition. Preferred multifunctional vinyl monomers have 2 to 6 functional groups. Most preferred multifunctional monomers have 2 to 3 functional groups. Flatting agent(s), pigment(s), small amounts of solvent(s), or other additives can be included in the composition as needed for a particular application. The composition can be coated or sprayed on a substrate and then cured by exposure to electron beam, visible, or ultraviolet radiation.

The release coating composition can be applied to suitable substrates by any conventional means such as by brushing, dipping, spraying, or by coating techniques such as offset gravure or transfer roll coating. The composition can also be applied in an electrospray coating process, as described in U.S. Pat. No. 4,748,043, the disclosure of which is incorporated herein by reference. The release coating composition is particularly well-suited for electrospray coating because it possesses a low surface tension and very low viscosity, which allows not only for generation of the fine droplets which characterize the electrospray process, but also ensures that once deposited on the substrate the droplets will rapidly and completely spread to form a continuous coating prior to cure. In most cases, it is desirable when electrospray coating to include in the composition a small amount of conductivity enhancing additive, such as methanol, (i.e., about 0.1 to about 5 percent by weight based upon the total weight of the release coating composition, preferably about 0.05 to about 2 percent by weight) in order to obtain a wide flow rate window which will enable the deposition of useful coating thicknesses (500 to 3000 Angstroms) at industrially viable line speeds (50 to 1000 m/min). When coating by methods other than electrospray, or when coating porous substrates such as paper, the viscosity of the composition is preferably increased prior to coating by addition of viscosity enhancer such as a copolymer comprising polar and nonpolar monomers or by a degree of prepolymerization of the monofunctional vinyl monomer(s) before addition of the multifunctional monomer(s) and telechelic silicones(s).

The release coating composition of this invention can be used as a coating on a substrate, which can be a sheet, a fiber, or a shaped object. However, the preferred substrates are those used for pressure-sensitive adhesive products. The composition can be applied to at least a portion of at least one major surface of suitable flexible or inflexible backing materials and then cured. Useful flexible backing materials include paper, plastic films such as poly(propylene), poly(ethylene), poly(vinyl chloride), poly(tetrafluoroethylene), polyester [e.g., poly(ethylene terephthalate)], polyimide film such as DuPont's Kapton™, cellulose acetate, and ethyl cellulose, although any surface requiring release toward adhesives can be used. Backings can thus also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film, or ceramic sheet material. Primers can be utilized, but they are not always necessary.

Curing of the hybrid release coating should be carried out in as oxygen-free an environment as possible, e.g., in an inert atmosphere such as nitrogen gas. When visible or ultraviolet radiation is used for curing, the composition also contains photoinitiator. Suitable photoinitiators include but are not limited to those selected from the group consisting of benzoin ethers, benzophenone and derivatives thereof, acetophenone derivatives, camphorquinone, and mixtures thereof. Photoinitiator is generally used at a concentration of from about 0.1 percent to about 5 percent by weight of the total weight of the release coating composition.

The release coating composition of this invention provides coatings which possess the desired level of release immediately upon curing. Thus, the composition is suitable for use in the integrated manufacture of PSA-coated labels and tapes. The composition is of relatively low silicone content, yet reliably and reproducibly provides the intermediate levels of release needed for LAB performance. The specific level of release provided upon curing can be controllably varied through variation in the weight percentage and molecular weight of telechelic silicones(s) included in the composition. The composition wets both paper and polymeric films well due to its homogeneity, which apparently derives from the use of only small amounts of silicone, the use of telechelic silicone(s) having polar endgroups compatible with the vinyl components, and the use of only small amounts of the highly polar multifunctional vinyl monomer(s). The use of difunctional, rather than monofunctional, silicone(s) ensures a high degree of co-cure of the silicone and vinyl components, and, thus, release coatings obtained via cure of the composition of the invention contain little or no free silicone to adversely affect the tack and peel properties of PSAs which come in contact with them. The-release coating composition of the invention cures rapidly to firmly anchored, highly crosslinked, solvent resistant, tack-free coatings which have utility for a broad range of PSA types such as natural rubber-based, acrylic, and other synthetic, film-forming elastomeric materials.

EXAMPLE

The following description includes exemplary preparations of copolymerizable telechelic silicones and numerous radiation-curable release coating compositions prepared with them in combination with monofunctional and multifunctional vinyl monomers. The description also includes the exemplary preparation of flexible substrates coated with the above-described release coating composition, radiation curing of said coating, and evaluation of immediate release properties and aged release properties of the cured coating. The monofunctional and multifunctional monomers used in these examples are set forth hereinafter in Table I. The pressure sensitive adhesive (PSA) coated tapes used in testing the release performance of these coatings are characterized in Table II. All parts and percentages in the examples and the rest of the specification are by weight unless otherwise specified.

TABLE I

| REACTANT ABBREVIATIONS | |
|---|---|
| Abbreviation | Reactant |
| | Photoinitiator |
| BP | benzophenone |
| | Monofunctional Reactants |
| IOA | isooctyl acrylate |
| NVP | N-vinyl pyrrolidone |
| HEA | 2-hydroxyethyl acrylate |
| AA | acrylic acid |
| LA | lauryl acrylate |
| ODA | octadecyl acrylate |
| EHA | 2-ethylhexyl acrylate |
| Sty | styrene |
| BMA | butyl methacrylate |
| ChxA | cyclohexyl acrylate |
| IBOA | isobornyl acrylate |
| | Multifunctional Reactants |
| HDDA | 1,6-hexanediol diacrylate |
| TMPTA | trimethylolpropane triacrylate |
| DVB | divinyl benzene |
| TMPTMA | trimethylolpropane trimethacrylate |
| EOTMPTA | triacrylate of ethoxylated trimethylolpropane |
| HDDA Aopate | 1,6-hexane diol di(beta-acryloxypropionate) |
| TMPTA Aopate | trimethylolpropane tri(beta-acryloxypropionate) |
| | Terms Used In Specification |
| visc. | viscosity |
| Imm. | immediate |
| RT | room temperature |
| Lamin. | lamination |
| Sil | silicone |
| | Functional Silicones |
| MAUS | methacryloxyurea siloxane |
| ACMAS | acrylamidoamido siloxane |
| MACMAS | methacrylamidoamido siloxane |
| MeStUS | α-methylstyrylurea siloxane |
| ACMS | acrylamido siloxane |
| CACMS | β-carboxyacrylamido siloxane |
| MAHAS | methacryloxyhydroxyamino siloxane |

TABLE II

| TEST TAPE CHARACTERIZATION | |
|---|---|
| Tape | Characterization |
| A | an aggressive latex acrylic PSA coated on a cellulose acetate backing |
| B | a latex rubber-resin PSA coated on a creped paper backing |
| C | a latex acrylic PSA coated on a non-woven rayon backing |
| D | a tackified block polymer PSA coated on a cast polypropylene backing |
| E | an aggressive solventborne acrylic PSA coated on a foamed acrylic rubber backing |
| F | a solventborne rubber-resin PSA coated on a creped paper backing |
| G | a solventborne acrylic PSA coated on biaxially oriented polypropylene backing |
| H | a removable acrylic PSA coated on a cellulose |

TABLE II-continued

TEST TAPE CHARACTERIZATION

| Tape | Characterization |
| --- | --- |
|  | acetate backing |
| I | a tackified block copolymer PSA coated on biaxially oriented polypropylene backing |

Test Methods

The test method used to evaluate the release coated flexible sheet materials of the Examples is a modification of the industry standard peel adhesion test used to evaluate PSA coated materials. The standard test is described in detail in various publications of the American Society for Testing and Materials (ASTM), Philadelphia, Pa., and the Pressure Sensitive Tape Council (PSTC), Glenview, Ill. The modified standard method is described in detail below. The reference source of the standard test method is ASTM D3330-78 PSTC-1 (11/75).

Immediate Release Value

This test measures the effectiveness of the LAB as a release agent. The immediate release value is a quantitative measure of the force required to remove a flexible adhesive tape from a substrate coated with the test composition at a specific angle and rate of removal. In the following examples this force is expressed in Newtons per decimeter (N/dm).

Immediate release testing was conducted by laminating a 2.54 cm by 20.32 cm strip of the coated substrate prepared in the examples coated side up to the stage of an Instrumentors, Inc. slip/peel tester (model 3M90) with double coated tape. A 1.9 cm by 15.24 cm strip of a PSA coated test tape (characterized in Table II) was rolled down onto the laminate thus formed with a 1.82 kg rubber roller. The force required to remove this tape at 180° and 228.6 cm/minute was then measured. The results of these tests are reported below.

Aged Release Value

Aged release testing was conducted in a similar manner to immediate release testing, with the exception of allowing the test tape to dwell in contact with the coated substrate for two days at either room temperature or 65° C., prior to removal. For these aged test tapes, readhesions were also measured by adhering the freshly peeled tape to a clean glass plate and measuring the peel adhesion in normal fashion using the same Instrumentors slip/peel tester indicated above, again peeling at 228.6 cm/min and at a 180° peel angle. The average value obtained is reported in Newtons per decimeter. These measurements were taken to determine whether a drop in the adhesion value occurred due to undesirable contamination of the adhesive surface by the release coating. The results of these tests are reported below.

Preparation of Functional Silicones

Difunctional polysiloxanes terminated on both ends with ethylenically unsaturated groups were prepared as described below. These are identified in the examples and in the tables as 4K ACMAS, 5K ACMAS, 10K ACMAS, 5K ACMS, 4K MACMAS, 20K MAHAS, 2.6K MAUS, 5K MAUS, 10K MAUS, 12K MAUS, 20K MAUS, 54K MAUS, and 5K MeStUS, wherein the number denotes molecular weight (MW) in thousands and the letters indicate the type of functionality as defined below. Synthesis of difunctional precursors for all free-radically polymerizable siloxanes described in this application was performed in the following way:

Preparation of α,ω-bis[3-aminopropyl] polydimethylsiloxane (PDMS)

A mixture of 14.9 g (0.06 mole) bis(3-aminopropyl) tetramethyldisiloxane endblocker and 103.0 g octamethylcyclotetrasiloxane ($D_4$) (previously purged for 10 minutes with argon, less than 20 ppm $H_2O$ by Karl-Fischer Titration) was stirred and heated to 80°–85° C. under argon in an oil bath. A small amount (0.03–0.05 g) of catalyst, anhydrous 3-aminopropyl dimethyl tetramethylammonium silanolate, was added and the reaction followed by vapor phase chromatography (VPC). In 30–45 minutes, the viscosity had increased and the end blocker had completely disappeared. Additional $D_4$ (250.0 g) was added dropwise at such a rate that the ratio of integrated areas of $D_4$ to $D_5$ peaks in the VPC of the reaction mixture did not exceed about 6 or 7:1 (5–6 hours). After addition was complete, heating was continued until equilibrium was achieved as judged by a return of the $D_4$:$D_5$ ratio to about 1.5:1 (2–3 hours). The reaction mixture was then heated to 150° C. for 30 minutes to decompose the catalyst and then stripped of residual cyclics under high vacuum (0.1–1.0 mm Hg). After cooling to 25° C., the diamino PDMS was obtained as a clear, colorless oil. The yield was 307.1 g (87%). The molecular weight of the product was determined by titration of a sample in THF/IPA with 0.05N HCl to a bromophenol blue end point, and, in this case, was found to be 5,100 g/mol (theoretical $M_n$=5,000 g/mol)

4K, 5K, 10K ACMAS

Polydimethylsiloxane terminated on both ends with acrylamidoamido groups and having an average molecular weight of about 5,000 (5K ACMAS) was prepared by thoroughly mixing 50 g (0.01 mole) of aminopropyl-terminated polydimethylsiloxane prepared according to the above description with 2.8 g (0.02 mole) of vinyldimethylazlactone (VDM), prepared as described in U.S. Pat. No. 4,777,276 (Rasmussen et al.), incorporated by reference herein, at room temperature.

The viscosity of the reaction mixture increased as the reaction progressed. The number average molecular weight of the difunctional polysiloxane was determined by acid titration of the precursor and was confirmed by gel permeation chromatography (GPC) analysis before and after capping with VDM. 4K ACMAS and 10K ACMAS, were prepared by using aminopropyl-terminated polydimethylsiloxane precursors with molecular weights of 4,000 and 10,000 respectively, prepared according to the above-described procedure.

2.6K, 5K, 10K, 12K, 20K, 54K MAUS 4K MACMAS/5K MeStUS/5K ACMS

Other free-radically polymerizable siloxanes were prepared by reacting aminopropyl-terminated polydimethylsiloxanes with varying molecular weights prepared according to the above-described method with other capping agents, such as with isocyanatoethyl methacrylate, commercially available from Showa Rhodia, isopropenyl dimethyl azlactone, prepared as described in U.S. Pat. No. 4,777,276

(Rasmussen et al.), and with m-isopropenyl-α,α-dimethyl benzyl isocyanate available from American Cyanamid under the trade name m-TMI™, at room temperature to form polysiloxanes with methacryloxyurea (MAUS), methacrylamidoamido (MACMAS), and α-methylstyryl urea (MeStUS) groups on both ends, respectively. 5,000 MW acrylamido functional siloxane (5K ACMS) was prepared by adding a solution of 3.79 g (26.3 mmol) acryloyl ethyl carbonic anhydride (prepared from ethyl chloroformate and acrylic acid according to the method of R. Hatada and H. Kondo, Bull. Chem. Soc. Japan, 41(10), 2521 (1968)) in 9 g $CH_2Cl_2$ to 59.1 g (11.8 mmol) 5,000 MW degassed aminopropyl-terminated polydimethylsiloxane (prepared according to the above-described method) in a 100 mL round bottom flask, stirring one hour at room temperature under nitrogen, and distilling off solvent on a rotary evaporator.

The preparation of acryloyl ethyl carbonic anhydride according to Hatada et al., *Bull. Chem. Soc. Japan,* 41 (10), 2521 (1968), is set forth below.

Into a 500 mL 2-neck round bottomed flask equipped with a mechanical stirrer and addition funnel equipped with a pressure equilibrating side-arm and attached nitrogen inlet was placed 100 g dichloromethane, 30 g (0.28 mole) ethyl chloroformate, and 10.7 g (0.27 mole) NaH as a 60% mineral oil dispersion. The head space was purged with nitrogen and resulting suspension cooled in an ice bath. 1 g of pyridine was added followed by dropwise addition of 19.2 g (0.27 mole) acrylic acid over 30 minutes to the well stirred cooled solution. The cooling bath was removed and the solution was agitated an additional 2 hours, then quenched by addition of 49 mL 5% aqueous HCl (i.e., 7 mL concentrated HCl diluted with 42 mL deionized water). The mixture was transferred to a separatory funnel, and the organic layer separated, washed one time with 20 mL deionized water, and dried over $MgSO_4$. After filtration, a small amount of phenothiazine (ca. 0.05 g) was added as inhibitor, and the solvent was stripped using a rotary evaporator at aspirator vacuum and room temperature. The resulting two phase material (product and mineral oil) was transferred to a distillation apparatus and distilled under reduced pressure (bp 60° C. at 0.05 mmHg) to yield product.

20K MAHAS

A polysiloxane with methacryloxyhydroxypropylamino (20K MAHAS) groups on both ends was prepared utilizing the procedure described in Example 4 of U.S. Pat. No. 4,293,397 incorporated by reference herein. 40.34 g (2 mmol) degassed 20,171 MW amine terminated polydimethylsiloxane synthesized as described above was placed in a 250 mL 2-neck flask containing 1.47 g (10.3 mmol) glycidyl methacrylate and 9.4 mg methoxyhydroquinone. A mechanical stirrer and a nitrogen inlet were attached, the headspace was flushed with nitrogen, and the reaction mixture was stirred for 65 hours at 60° C.

Examples 1 through 10 and Comparative Example 1

These examples show variation in silicone MW and functionality.

A master batch was prepared by mixing 135 g isooctyl acrylate (IOA), 15 g ethoxylated trimethylol propane triacrylate (EOTMPTA, available from Arco Chemical Company under the tradename Sartomer™ 454), and 6 g benzophenone (BP). 10 g aliquots of the resulting solution were combined with 50 mg of 2.6K, 5K, 10K, 20K, and 54K MAUS, 5K ACMAS, 5K MeStUS, 5K ACMS, 4K MACMAS, and 20K MAHAS (Examples 1 through 10 respectively). These clear solutions were thinly coated by hand onto 61 micron biaxially oriented polypropylene (BOPP) by pouring a small amount onto one end of a 15.2 cm by 91 cm sheet of film and spreading down its length with a paper tissue. The coatings were passed through a PPG Industries UV processor three passes at 22.9 meters per minute with two medium pressure mercury lamps on at 78.7 W/cm (total dose 300 $mJ/cm^2$) under a nitrogen atmosphere. The starting master batch solution (containing no silicone) was coated and cured in similar fashion as Comparative Example 1. The resulting cured coatings were conditioned overnight under constant temperature and humidity conditions (22° C. and 50% relative humidity) and tested for immediate and aged release performance using test methodology described above. Results are presented in Table III and show that the presence of a low level of difunctional silicone imparts significantly lower levels of release than a similar coating with no silicone and that a wide range of molecular weights and functionalities for the silicone are useful in practicing this invention.

Examples 11 through 14

These examples show variation in the nature of the polar monomer.

A master batch was prepared by mixing 40 g IOA, 10 g EOTMPTA, 2 g BP, and 1 g 5K MAUS. 6 g aliquots of the resulting solution were combined with 1 g of N-vinyl pyrrolidone (NVP) or 2-hydroxyethyl acrylate (HEA) (Examples 11 and 12 respectively, both hazy) or 2 g of acrylic acid (AA) or IOA (Examples 13 and 14, respectively, both clear). These solutions were coated, cured, and tested using the procedure described in Example 1 above, with the exception that the coatings were cured with four passes at 22.9 meters per minute (total dose 400 $mJ/cm^2$) rather than three. Results of the release testing are presented in Table IV and show that the presence of polar monomers to, for example, promote adhesion to substrate, in general does not influence the release performance of these coatings. In the case of Example 11, the basic nature of the NVP in the coating leads to specific interaction with the AA present in the PSA, giving a build in release on aging.

Examples 15 through 22 and Comparative Examples 2 through 4

These examples show use of high levels of silicone and solution casting of PSA onto the resulting coated release sheets. The examples compare these materials to similar coatings made using a commercially available methacrylated silicone and to a paper release liner coated with a commercial silicone.

A master batch was prepared by mixing 108 g IOA, 12 g EOTMPTA, and 4.8 g BP. 6 g aliquots of the resulting solution were combined with 0.3, 0.6, 0.9, and 1.5 g of 5K MAUS (Examples 15 through 18, respectively); 0.3, 0.6, 0.9, and 1.5 g 10K MAUS (Examples 19 through 22, respectively); and 0.3 and 0.6 g of a methacrylate functional silicone fluid (30 centistokes viscosity) available from SWS Silicones under the tradename F-815™(Comparative Examples 2 and 3). These clear solutions were coated, cured, and conditioned using the procedure described in Example 11 above. They were tested for release performance by overcoating them using a knife coater with a tackified block polymer PSA solution of 10 g of a styrene-isoprene block polymer (obtained from Shell under the tradename™ 1107), 10 g of a aliphatic tackifying resin (obtained from Goodyear Tire under the tradename Wingtack Plus™), and 30 g toluene, and drying (30 min at 65° C.) to yield a 25 micron thick dry adhesive coating. An acrylate PSA consisting of a 94/6 IOA/AA solution copolymer at 35% solids in ethyl acetate prepared according to methods described by Ulrich in U.S. Pat. No. Re. 24,906 incorporated by reference herein was similarly coated and dried 10 min at 65° C. These same adhesives were also solvent cast and dried onto a paper liner coated with a condensation cured solventborne silicone release coating available from Dow Corning under the tradename Syl-off (Comparative Example 4). The resulting adhesive films were conditioned for two days under constant temperature and humidity conditions (22° C. and 50% relative humidity) and a 35 micron thick polyester terephthalate (PET) film was laminated to them. 1.3 cm×15.2 cm strips of these laminates were cut and release and readhesion measured as described above. The laminates were also dwelled in a 65° C. oven for 2 days and tested for release and readhesion. Results of the release testing are presented in Table V and show somewhat higher levels of release than the standard siliconized paper liner and improved readhesion values, particularly for the tackified block polymer PSA, relative to similar coatings prepared with F-815.

Examples 23 through 32

These examples show variation in the amount of acrylic acid (AA) present in either an IOA or lauryl acrylate (LA) based release coating at constant silicone content (2% 5K MAUS).

A master batch was prepared by mixing 41.25 g IOA, 11.25 g EOTMPTA, 1.5 g 5K MAUS, and 3 g BP. 7.6 g aliquots of the resulting solution were combined with 3 g IOA, 2.5 g IOA and 0.5 g AA, 2 g IOA and 1 g AA, 1 g IOA and 2 g AA, and 3 g AA (Examples 23 through 27, respectively). All were clear solutions except for 27, which was very slightly hazy. A similar series of formulations were made up by substituting lauryl acrylate (LA) for IOA in both the master batch and dilutions (Examples 28 through 32, respectively). Formulations 28 and 29 were clear solutions, 30 very slightly hazy, 31 slightly hazy, and 32 was hazy. These solutions were coated, cured, and tested using the procedure described in Example 1 above with the exception that the coatings were cured with four passes at 22.9 mpm (total dose 400 mJ/cm$^2$) rather than three, and immediate release testing was not done. Results of the release testing are presented in Table VI. These results show that the presence and level of AA does not have a significant effect on the release performance and that the use of LA gives somewhat lower release than IOA.

Examples 33 through 38 and Comparative Examples 5 and 6

These examples show an LA/EOTMPTA/AA system with varying low levels of silicone and a similar series prepared with slightly prepolymerized LA to enhance the coating viscosity.

A master batch was prepared by mixing 34 g LA, 4 g EOTMPTA, 2 g AA, and 1.6 g BP. This had a Brookfield viscosity of 8 centipoise (spindle 2, 60 rpm). 10 g aliquots of the resulting solution were combined with 20.8, 52.2, and 98.5 mg 5K MAUS (Examples 33 through 35, respectively). A second master batch was prepared by combining 34 g LA, 2 g AA, and 114.7 mg Irgacure™ 651 photoinitiator, a benzoin ether type free radical initiator available from Ciba-Geigy, purging the resulting solution five minutes with nitrogen at 1 L/min, and inducing polymerization by shaking the sealed glass bottle under low intensity UV lights until an exotherm and increase in viscosity was noted. To the resulting syrup was added 4 g EOTMPTA and 1.6 g BP to yield a master batch with a Brookfield viscosity of 487 centipoise (spindle 2, 30 rpm). 10 g aliquots of this were combined with 22.2, 47.9, and 97.7 mg 5K MAUS (Examples 36 through 38, respectively). The resulting clear solutions as well as the starting non-silicone containing low and high viscosity master batches (Comparative Examples 5 and 6, respectively) were coated, cured, and tested using the procedure described in Example 1 above with the exception that the coatings were cured with four passes at 22.9 meters per minute (total dose 400 mJ/cm$^2$) rather than three. Results of the release testing are presented in Table VII and show that raising the viscosity of the coating solution (desirable for coating by, for example, differential gravure methods) does not significantly alter release performance and again demonstrates that the presence of a low level of difunctional silicone significantly lowers release relative to the same coating composition with no silicone.

Examples 39 through 46

These examples show the use of mixtures of IOA and LA for the monofunctional monomer adding two different molecular weight silicones at two different levels.

A master batch was prepared by mixing 26.3 g LA, 8.8 g IOA, 3 g EOTMPTA, 2 g AA, and 2 g BP. 5 g aliquots of the resulting solution were combined with 0.1 g and 0.2 g 5K MAUS (Examples 39 and 40) and 0.1 g and 0.2 g 10K MAUS (Examples 41 and 42). A second master batch was prepared by mixing 17.5 g LA, 17.5 g IOA, 3 g EOTMPTA, 2 g AA, and 2 g BP. 5 g aliquots of the resulting solution were combined with 0.1 g and 0.2 g 5K MAUS (Examples 43 and 44) and 0.1 g and 0.2 g 10K MAUS (Examples 45 and 46). The resulting clear solutions were coated, cured, and tested using the procedure described in Example 1 above with the exception that the coatings were done on 35 micron PET rather than 61 micron BOPP and readhesion testing was not done. Results of the release testing are presented in Table VIII and show that mixtures of monofunctional monomers are useful in the practice of this invention.

Examples 47 through 50 and Comparative Examples 7 and 8

These examples show the use of mixtures of IOA or LA with octadecyl acrylate (ODA) for the monofunctional monomer adding silicone at two different levels. They also demonstrate coating as a high solids solution in cyclohexane rather than the 100% solids materials described above, this being done in order to keep the crystalline ODA in solution for coating.

A master batch was prepared by mixing 42 g of a 50% solids solution of ODA in cyclohexane, 2.8 g EOTMPTA, 1.4 g AA, and 1.1 g BP. 6.8 g aliquots of the resulting solution were combined with 1.3 g IOA (Comparative Example 7), 1.3 g IOA and 0.1 g 12K MAUS (Example 47), 1.3 g IOA and 0.2 g 12K MAUS (Example 48), 1.3 g LA (Comparative Example 8), 1.3 g LA and 0 g 12K MAUS (Example 49), and 1.3 g LA and 0.2 g 12K MAUS (Example 50). These solutions were coated, cured, and tested using the procedure described in Example 1 above with the exception that the coatings were cured with five passes at 22.9 meters per minute (total dose 500 mJ/cm$^2$) rather than three, the coatings were dried 40 minutes at 65° C. after curing to remove residual cyclohexane, and readhesion testing was not done. Results of the release testing are presented in Table IX and show that mixtures of monofunctional monomers including ODA are useful in the practice of this invention and that coating can be done with added solvent without unduly influencing release.

Examples 51 through 56

These examples show the use of 2-ethylhexyl acrylate (EHA) as the monofunctional acrylate and the use of high levels of 1,6-hexanediol diacrylate (HDDA) or mixtures of HDDA and trimethylol propane triacrylate (TMPTA) as the multifunctional acrylate.

A master batch was prepared by mixing 35 g EHA, 15 g HDDA, and 1.5 g BP. 10.3 g aliquots of the resulting solution were combined with 60.7 mg, 0.2 g, and 0.5 g 10K ACMAS (Examples 51 through 53, respectively). A second master batch was prepared by mixing 35 g EHA, 10 g TMPTA, 5 g HDDA, and 1.5 g BP. 10.3 g aliquots of the resulting solution were combined with 60.5 mg, 0.2 g, and 0.5 g 5K ACMAS (Examples 54 through 56, respectively). These solutions were coated, cured, and tested using the procedure described in Example 1 above with the exception that the coatings were cured with four passes at 18.3 meters per minute (total dose 500 mJ/cm$^2$) rather than three at 22.9 meters per minute. Results of the release testing are presented in Table X and show that high levels of multifunctional monomers and mixtures of them are useful in the practice of this invention.

Examples 57 through 66

These examples show the use of high levels of mixtures of multifunctional acrylates as well as the use of beta-acryloxypropionates of 1,6-hexane diol and trimethylol propane.

A solution of 0.5 g 10K ACMAS in 49.5 g EHA was prepared and 5 g aliquots were combined with 1 g EHA, 1 g TMPTA, 3 g HDDA, and 0.3 g BP (Example 57—slightly hazy) or with 1 g EHA, 1.5 g TMPTA, 2 g HDDA, 0.5 g AA, and 0.3 g BP (Example 58—slightly hazy); 3 g aliquots were combined with 3 g EHA, 1 g TMPTA, 3 g HDDA, and 0.3 g BP (Example 59—very slightly hazy) or with 3 g EHA, 1.5 g TMPTA, 2 g HDDA, 0.5 g AA, and 0.3 g BP (Example 60—very slightly hazy); and 1 g aliquots were combined with 5 g EHA, 1 g TMPTA, 3 g HDDA, and 0.3 g BP (Example 61—clear) or with 5 g EHA, 1.5 g TMPTA, 2 g HDDA, 0.5 g AA, and 0.3 g BP (Example 62—clear). Similarly a solution of 2.0 g 10K ACMAS in 48 g IOA was prepared and 5 g aliquots were combined with 3 g IOA, 2 g of the di(beta-acryloxypropionate) ester of 1,6-hexanediol ("HDDA Aopate") available from Rohm and Haas under the trade name QM926™, and 0.3 g BP (Example 63—hazy); with 2.5 g IOA, 1.5 g of the tri(beta-acryloxypropionate) ester of trimethylolpropane ("TMPTA Aopate") available from Rohm and Haas under the trade name QM920™, 1 g AA, and 0.3 g BP (Example 64—hazy); with 3.5 g IOA, 1.5 g TMPTA Aopate, and 0.3 g BP (Example 65—slightly hazy); or with 3 g IOA, 1.5 g HDDA Aopate, 0.5 g AA, and 0.3 g BP (Example 66—clear). These solutions were coated, cured, and tested using the procedure described in Example 1 above with the exception that the coatings were cured with three passes at 18.3 meters per minute (total dose 375 mJ/cm$^2$) rather than three at 22.9 meters per minute onto a cast polypropylene backing, release testing for Examples 57 through 62 was done at 30.5 cm/min rather than 228.6 cm/min, and readhesion testing was not done. Results of the release testing are presented in Table XI and also show that high levels of multifunctional monomers and mixtures of them are useful in the practice of this invention and that the "Aopates" are useful multifunctional monomers.

Examples 67 through 72

These examples show the use of partially prepolymerized EHA or EHA/AA mixtures to impart higher viscosity to the coating solution.

70 g EHA and 0.3 g Irgacure™ 651 photoinitiator available from Ciba-Geigy were combined, purged five minutes with nitrogen at 1 L/min, and polymerization induced by shaking the sealed glass bottle under low intensity UV lights until an exotherm and increase in viscosity was noted. To the resulting syrup was added 20 g TMPTA, 10 g HDDA, and 3 g BP to yield a master batch with a Brookfield viscosity of 545 centipoise (spindle 2, 30 rpm). 20.6 g aliquots of this were combined with 0.1 g and 0.4 g 5K ACMAS (Examples 67—clear and 68—hazy, respectively). Similarly a mixture of 65 g EHA, 5 g AA, and 0.3 g Irgacure™ 651 was prepared, purged, polymerized, and combined with 20 g TMPTA, 10 g HDDA, and 3 g BP to yield a master batch with a Brookfield viscosity of 475 centipoise (spindle 2, 30 rpm). 20.6 g aliquots of this were combined with 0.1 g and 0.4 g 5K ACMAS (Examples 69—slightly hazy and 70 hazy, respectively) or with 0.1 g and 0.4 g 5K MeStUS (Examples 71—slightly hazy and 72—hazy, respectively). These solutions were coated, cured, and tested using the procedure described in Example 1 above, with the exception that the coatings were cured with three passes at 18.3 meters per minute (total dose 375 mJ/cm$^2$) rather than three at 22.9 meters per minute onto a cast polypropylene backing and release testing was done at 30.5 cm/min rather than 228.6 cm/min. Results of the release testing are presented in Table XII and also show that the use of viscosity enhanced coating solutions does not substantially influence release performance.

Example 73 and Comparative Examples 9 through 11

These examples contrast release results for a coating made following the teachings of this invention (containing 10% multifunctional monomer and a low level of silicone (5%)) with coatings prepared from the same silicone at a high level combined with monofunctional monomer but no multifunctional monomer.

A mixture of 9 g IOA, 1 g TMPTA Aopate, 0.5 g 10K MAUS, and 0.3 g BP was prepared (Example 73—clear). Similarly prepared were mixtures of 2 g IOA, 8 g 5K MAUS, and 0.3 g BP (Comparative Example 9—clear), 3 g isobornyl acrylate (IBOA), 7 g 10K MAUS, and 0.3 g BP (Comparative Example 10—clear), and 2 g LA, 8 g 10K MAUS, and 0.3 g BP (Comparative Example 11—hazy). These solutions were coated, cured, and tested using the procedure described in Example 1 above with the exception that the coatings were cured with three passes at 18.3 meters per minute (total dose 375 mJ/cm$^2$) rather than three at 22.9 meters per minute. Results of the release testing are presented in Table XIII and show that even at high levels of silicone the release value builds much higher on heat aging in the absence of a multifunctional monomer.

Examples 74 through 77 and Comparative Example 12

These examples show the use of electron beam irradiation to cure the coatings, demonstrate curing onto a high density polyethylene substrate (HDPE), and contrast release results for these coated sheets with those obtained from uncoated HDPE.

Mixtures of 7 g EHA, 3 g HDDA, and 40.5 mg 10K MAUS (Example 74); 7 g EHA, 3 g HDDA, and 0.2 g 10K MAUS (Example 75); 7 g EHA, 1 g HDDA, 1 g TMPTA, 1 g AA, and 40.4 mg 5K MAUS (Example 76); and 7 g EHA, 1 g HDDA, 1 g TMPTA, 1 g AA, and 0.2 g 5K MAUS (Example 77) were prepared and the resulting clear solutions wipe coated onto 102 micron thick HDPE film as described in Example 1 above. The resulting coatings were passed through an ESI Electrocurtain™ CB-150 electron beam processor at 6.1 meters per minute, given a dose of 4 Mrad at 175 KeV accelerating voltage. The resulting cured coatings along with a sheet of uncoated HDPE (Comparative Example 12) were conditioned overnight under constant temperature and humidity conditions (22° C. and 50% relative humidity). A 2.5 cm×15.2 cm piece of the acrylic foam tape construction, test tape E, was laminated to these sheets with a 1.82 kg rubber roller and the resulting laminate dwelled two days at room temperature or 65° C. Release testing in this case was done by attaching the foam tape construction to the stage of the slip/peel tester with double stick tape and peeling the HDPE sheet from it at 180° and 30.5 cm/min. Neither immediate release nor readhesion testing was done in this case. Results are shown in Table XIV and demonstrate that electron beam curing is an effective means of imparting cure, that HDPE can successfully be used as a substrate for these coatings, and that release performance for these coatings is significantly lower than the relatively low energy uncoated HDPE.

Examples 78 through 83

These examples show the use of up to 70% multifunctional reactant and also compare release results for tapes laminated to coatings immediately after cure to tests of the same coatings after a 24 hour conditioning period. This comparison serves as an illustration of performance in an integrated manufacturing situation where adhesive would be contacted with the release coating shortly after cure.

A master batch of 0.5 g 4K ACMAS in 9.5 g IOA was prepared. 1 g aliquots of this were combined with 6 g IOA, 3 g HDDA, and 0.2 g Darocur™ 1173 acetophenone type free radical initiator available from EM Industries Inc. (Example 78—clear); with 5 g IOA, 4 g HDDA and 0.2 g Darocur™ 1173 (Example 79—clear); with 4 g IOA, 5 g HDDA, and 0.2 g Darocur™ 1173 (Example 80—very slightly hazy); with 3 g IOA, 6 g HDDA, and 0.2 g Darocur™ 1173 photoinitiator, (Example 81—hazy); with 2.5 g IOA, 6.5 g HDDA, and 0.2 g Darocur™ 1173 (Example 82—hazy); and with 2 g IOA, 7 g HDDA, and 0.2 g Darocur™ 1173 (Example 83—hazy). These solutions were coated, cured, and tested using the procedure described in Example 1 above. Test tapes were also laminated to coatings from Examples 78 and 79 immediately after curing (within one minute), and aged release and readhesion testing was conducted as described above. Results are shown in Table XV and demonstrate the utility of very high levels of multifunctional monomer as well as the fact that these coatings attain their release performance immediately after cure.

Examples 84 through 88

These examples show the use of non-acrylate (e.g., methacrylate or styrenic) mono- and multifunctional reactants and the use of cyclohexyl acrylate.

A master batch of 0.5 g 4K ACMAS in 9.5 g IOA was prepared. 1 g aliquots of this were combined with 5 g IOA, 3 g HDDA, 1 g divinyl benzene (DVB), and 0.2 g Darocur™ 1173 (Example 84); with 5 g IOA, 3 g HDDA, 1 g trimethylol propane trimethacrylate (TMPTMA), and 0.2 g Darocur™ 1173 (Example 85); with 4 g IOA, 2 g styrene (Sty), 3 g HDDA, and 0.2 g Darocur™ 1173 (Example 86); and with 4 g IOA, 2 g butyl methacrylate (BMA), 3 g HDDA, and 0.2 g Darocur™ 1173 (Example 87). A mixture of 8 g cyclohexyl acrylate (ChxA), 2 g HDDA, 1 g 4K ACMAS, and 0.2 g Darocur™ 1173 was prepared as Example 88. These clear solutions were coated, cured, and tested using the procedure described in Example 1 above with the exception that the coatings were cured with four passes at 22.9 meters per minute (total dose 400 mJ/cm$^2$) rather than three. Results are shown in Table XVI and demonstrate that methacrylate or styrenic mono- and multifunctional reactants as well as cyclohexyl acrylate are useful in the practice of this invention.

Examples 89 through 93 and Comparative Example 13

These examples show the application of the release coatings using the electrospray process onto both polyester (PET) and biaxially oriented polypropylene (BOPP) film and give release results for different types of adhesives at varying silicone levels compared to a similar coating with no silicone.

A mixture of 225 g IOA, 75 g HDDA, 6 g Darocur™ 1173, and 30 g methanol was prepared (Comparative Example 13) giving a solution with conductivity 8 microsiemens/m, Brookfield viscosity 6 centipoise, and surface tension 22.5 dynes/cm. Identical formulations were prepared containing in addition 0.3 g (Example 89), 0.6 g (Example 90), 1.5 g (Example 91), 3.0 g (Example 92), and 15.0 g (Example 93) 10K ACMAS which had similar viscosities, surface tensions, and conductivities in the range of 8 to 12 microsiemens per meter. These clear solutions were introduced into a coating head which contained 21 capillary needles using a Sage Model 355 syringe pump. The design of this electrospray coating head, which coats a width of 25.4 cm, and specifics about the line used are disclosed in U.S. Pat. No. 4,748,043. A voltage differential of 5.4 to 5.5 KV dc was applied between the capillary needles and the extractor plate, which was held at 4 KV dc above ground potential (i.e., the capillary needles were 9.4 to 9.5 KV dc above ground). The extractor plate was spaced 9 cm from the film surface. The film passed under a Corona charger and the surface was charged to a potential of −2.4 to −3.3 KV/cm$^2$. At a constant syringe pump speed delivering 1474 microliters per hour per orifice, samples of BOPP were coated at 2000 angstroms (based on first principles) at 9.1 meters per minute web transport speed, and PET at 1000 and 2000 angstroms at 18.3 and 9.1 meters per minute, respectively. Curing was done in an inert nitrogen atmosphere with one 78.7 Watt/cm medium pressure mercury ultraviolet light (corresponding to a dose of 100 mJ/cm$^2$ at 9.1 meters per minute and 51 mJ/cm$^2$ at 18.3 meters per minute), then conditioned and tested as described in Example 1 above. Results are shown in Table XVII and demonstrate the ability to tailor release level by varying the amount of silicone present, as well as the utility of this coating process for the release coating compositions of this invention.

Examples 94 through 98 and Comparative Example 14

These examples show the use of the electrospray process to coat formulations with various types and levels of monofunctional reactant and multifunctional reactant. The use of a level of multifunctional reactant outside the useful region is also shown as a comparative example.

Solutions were prepared and coated onto BOPP at 2000 angstroms using the process and conditions described in Example 89 above except that web speed was held at 18.3 meters per minute, syringe pump speed delivery was increased to 2793 microliters per hour per orifice, and curing was done with two medium pressure mercury lamps at 78.7 Watt/cm (total dose 101 mJ/cm$^2$). Conditioning and testing was conducted as described in Example 1 above. Specifics of the solutions, including formulation, conductivity, surface tension, and viscosity were as follows. Example 94: a mixture of 435 g IOA, 60 g HDDA, 45 g TMPTA, 30 g AA, 12 g 5K ACMAS, 12 g Darocur™ 1173, and 30 g methanol; 1.5 microsiemens per meter, 24.5 dynes/cm, 5 centipoise. Example 95: a mixture of 240 g IOA, 15 g AA, 45 g HDDA, 7.5 g 5K ACMAS, 15 g methanol, and 6 g Darocur™ 1173; 2.0 microsiemens per meter, 23.4 dynes/cm, 5 centipoise. Example 96: a mixture of 210 g IOA, 90 g HDDA, 45 g 4K ACMAS, 15 g methanol, and 6 g Darocur™ 1173; 4.5 microsiemens per meter, 22.9 dynes/cm, 8 centipoise. Example 97: a mixture of 120 g isobornyl acrylate (IBOA), 90 g IOA, 90 g HDDA, 45 g 4K ACMAS, 15 g methanol, and 6 g Darocur™ 1173; 4 microsiemens per meter, 23 dynes/cm, 11 centipoise. Example 98: a mixture of 210 g IBOA, 90 g HDDA, 45 g 4K ACMAS, 15 g methanol, and 6 g Darocur™ 1173; 2.5 microsiemens per meter, 23.5 dynes/cm, 14 centipoise. Comparative Example 14: a mixture of 255 g IOA, 45 g AA, 18 g HDDA, 45 g 10K ACMAS, 15 g methanol, and 6 g Darocur™ 1173; 1.2 microsiemens per meter, 24.5 dynes/cm, 5 centipoise. Results are presented in Table XVIII and demonstrate that a wide variety of formulations can be successfully electrosprayed. The comparative example shows that at multifunctional reactant contents lower than 5%, release value increases significantly on aging relative to similar coatings with higher crosslink density, and readhesion values are lower.

Examples 99 and 100 and Comparative Example 15

These examples show electrospray coating of the release coating compositions of this invention onto a paper substrate and compare the release obtained to that obtained from the uncoated paper for a repositionable adhesive.

The formulations from Examples 94 and 95 described above were electrosprayed onto a sub 20 bond paper (Examples 99 and 100 respectively) at 1000, 1500, and 2000 angstroms by varying the syringe pump speed delivery between 1396, 2095, and 2793 microliters per hour per orifice at constant web speed (18.3 meters per minute). Curing, conditioning, and testing was conducted as described in Example 94 above. The results are shown in Table XIX and are compared to release testing done from uncoated paper (Comparative Example 15), demonstrating utility for paper substrates.

Examples 101 and 102

These examples show the use of the release coating compositions of this invention in an indirect transfer roll coating technique coupled with electron beam curing.

Partially prepolymerized syrups of isooctyl acrylate (IOA) and 2-ethylhexyl acrylate (EHA) were prepared using techniques described in Examples 33 and 67 above. Example 101: 250 g of the IOA syrup (Brookfield viscosity 13,000 centipoise) was combined with 245 g IOA monomer, 0.6 g 10K MAUS, 60 g HDDA, and 45 g TMPTA to yield a clear solution with Brookfield viscosity 712 centipoise (spindle 2, 30 rpm). Example 102: 175 g of the EHA syrup (Brookfield viscosity 11,500 centipoise) was combined with 275 g EHA monomer, 45 g 10K MAUS, 120 g HDDA, and 30 g TMPTMA. The resulting solution was somewhat hazy, so an additional 43 g EHA monomer was added to clear it up. The resulting solution had a Brookfield viscosity of 141 centipoise (spindle 2, 60 rpm). Coating was done onto either 25 micron PET (Example 101) or 41 micron PET (Example 102) using a Polytype S.A. Fribourg Labcoat™ five roll coater run in an indirect transfer roll coating mode with a smooth steel pick up roll (without doctor blade) running at one-tenth the speed of the rubber transfer roll which was run at a fifty percent higher speed than the web line (running at 4.6 meters per minute) to smooth the coating. Curing was done with an ESI Electrocurtain™ model CB 300/30/380 electron beam processor at 3 Mrad and 175 KeV in a nitrogen atmosphere. Samples were conditioned and tested as described in Example 1 above. Results are shown in Table XX and demonstrate that the release coating compositions of this invention can be coated with traditional roll coating methods.

Example 103

This example demonstrates the use of the release coating compositions of this invention in a differential gravure coating technique.

175 g of the partially prepolymerized syrup of EHA described in Example 101 above was combined with 245 g EHA monomer, 180 g HDDA, 24 g BP, and 18 g 5K MAUS to yield a clear solution with a Brookfield viscosity of 150 centipoise (spindle 3, 12 rpm). Coating was done onto 41 micron PET using a Worldwide brand four roll coater run in a differential gravure mode (200 line pyramidal gravure cylinder as pick up roll, smooth rubber roll as transfer roll, and steel back up roll). At a line speed of 10.4 meters per minute, the ratio of transfer roll speed (run at the same speed as the web) to pick up roll speed was varied from 8:1 to 10:1 to 13:1 to 15:1 to obtain descending coating weights. Curing was done with three 78.7 Watts/cm medium pressure mercury lamps (total dose 200 mJ/cm$^2$) under a nitrogen atmosphere. Tape I was laminated to these coatings within 5 minutes of cure with a 1.82 kg rubber roller, and immediate release testing was done as described above. Readhesion testing of this tape was also conducted on a clean glass plate. Aged release and readhesion testing was not performed in this instance. Results are shown in Table XXI and demonstrate that the release coating compositions of this invention can be coated by differential gravure techniques with higher release values being obtained at lower coating weights.

TABLE III

Variation in Silicone MW & Functionality in a 90/10 IOA/EOTMPTA + 4% Benzophenone Formulation

| No. | 0.5% Silicone | Tape | Release (N/dm) | | | Readhesion (N/dm) 2 | |
|---|---|---|---|---|---|---|---|
| | | | Imm. RT | 2 day RT | 2 day 65° C. | day RT | 2 day 65° C. |
| 1 | 2.6K | A | 4.4 | 12.5 | 19.6 | 34.4 | 33.3 |
| | MAUS | B | 16.2 | 30.0 | 34.4 | 47.7 | 49.9 |
| 2 | 5K | A | 1.9 | 6.7 | 7.4 | 35.6 | 36.3 |
| | MAUS | B | 10.1 | 18.4 | 24.1 | 47.7 | 51.0 |
| 3 | 10K | A | 1.2 | 10.2 | 5.8 | 38.4 | 34.6 |
| | MAUS | B | 9.0 | 18.8 | 20.1 | 48.6 | 50.8 |
| 4 | 20K | A | 0.9 | 3.4 | 5.5 | 35.5 | 37.6 |
| | MAUS | B | 3.7 | 11.2 | — | 47.1 | — |
| 5 | 54K | A | 0.6 | 2.3 | 5.1 | 35.9 | 29.0 |
| | MAUS | B | 2.0 | 4.6 | 11.2 | 52.5 | 52.8 |
| 6 | 5K | A | 0.6 | 3.6 | 6.6 | 33.7 | 26.0 |
| | MAUS | B | 4.4 | 8.5 | 16.8 | 54.3 | 50.3 |

TABLE III-continued

Variation in Silicone MW & Functionality in a 90/10 IOA/EOTMPTA + 4% Benzophenone Formulation

| No. | 0.5% Silicone | Tape | Release (N/dm) Imm. RT | Release (N/dm) 2 day RT | Release (N/dm) 2 day 65° C. | Readhesion (N/dm) 2 day RT | Readhesion (N/dm) 2 day 65° C. |
|---|---|---|---|---|---|---|---|
| 7 | 5K MAUS | A | 0.6 | 3.6 | 6.6 | 33.7 | 26.0 |
|   |  | B | 10.1 | 14.7 | 27.6 | 49.3 | 51.7 |
| 8 | 5K ACMS | A | 0.6 | 1.9 | 3.8 | 32.4 | 37.1 |
|   |  | B | 1.4 | 8.2 | 14.5 | 44.6 | 43.1 |
| 9 | 4K MACMAS | A | 1.0 | 4.7 | 6.7 | 35.2 | 32.5 |
|   |  | B | 3.1 | 12.8 | 19.6 | 41.9 | 41.5 |
| 10 | 10K MAHAS | A | 0.7 | 5.5 | 5.1 | 33.3 | 32.1 |
|    |  | B | 7.8 | 10.3 | 21.7 | 42.7 | 40.6 |
| Comp. 1 | no silicone | A | 9.8 | 29.3 | 25.7 | 34.9 | 31.4 |
|   |  | B | 38.1 | 24.1 | 45.5 | 47.7 | 50.1 |

TABLE IV

Variation in Polar Monomer Nature Using 6 g Aliquot of 40/10/2/1 IOA/EOTMPTA/BP/5K MAUS

| No. | Added Monomer | Tape | Release (N/dm) Imm. RT | Release (N/dm) 2 day RT | Release (N/dm) 2 day 65° C. | Readhesion (N/dm) 2 day RT | Readhesion (N/dm) 2 day 65° C. |
|---|---|---|---|---|---|---|---|
| 11 | 1 g NVP | A | 2.2 | 33.7 | 32.1 | 31.0 | 28.7 |
|    |  | B | 2.6 | 12.0 | 17.5 | 39.4 | 39.8 |
| 12 | 1 g HEA | A | 0.4 | 2.9 | 6.0 | 43.3 | 35.0 |
|    |  | B | 2.2 | 11.4 | 17.7 | 44.0 | 47.7 |
| 13 | 2 g AA | A | 0.6 | — | 4.4 | 30.3 | 33.1 |
|    |  | B | 3.7 | 9.9 | 17.9 | 42.9 | 42.2 |
| 14 | 2 g IOA | A | 0.6 | 3.5 | 6.4 | 36.5 | 31.2 |
|    |  | B | 3.5 | 11.6 | — | 44.0 | 45.8 |

TABLE V

Variation in Amount of 5K & 10K MAUS in 90/10 IOA/EOTMPTA + 4% BP Formulation

| No. | Additive | Adhesive | Release (N/dm) 2 day RT | Release (N/dm) 2 day 65° C. | Readhesion (N/dm) 2 day RT | Readhesion (N/dm) 2 day 65° C. |
|---|---|---|---|---|---|---|
| 15 | 5% 5K MAUS | Kraton* Acrylate | 2.0 5.3 | 3.3 12.0 | 89.5 61.7 | 76.0 43.8 |
| 16 | 10% 5K MAUS | Kraton Acrylate | 1.1 3.1 | 1.8 11.8 | 77.9 70.7 | 76.4 58.7 |
| 17 | 15% 5K MAUS | Kraton Acrylate | 2.0 2.4 | 2.4 9.6 | 81.0 62.6 | 80.6 55.2 |
| 18 | 25% 5K MAUS | Kraton Acrylate | 1.8 2.6 | 1.8 11.8 | 76.2 61.9 | 79.0 50.1 |
| 19 | 5% 10K MAUS | Kraton Acrylate | 1.8 3.9 | 2.4 12.7 | 91.1 60.0 | 84.3 50.1 |
| 20 | 10% 10K MAUS | Kraton Acrylate | 2.8 5.5 | 2.6 11.6 | 77.5 60.9 | 75.3 49.5 |
| 21 | 15% 10K MAUS | Kraton Acrylate | 2.0 3.1 | 4.6 9.4 | 70.5 56.7 | 61.5 49.9 |
| 22 | 25% 10K MAUS | Kraton Acrylate | 0.4 2.8 | 2.6 8.3 | 65.5 56.9 | 60.6 47.3 |
| Comp. 2 | 5% F-815 | Kraton Acrylate | 2.6 2.2 | 2.2 2.4 | 64.4 53.4 | 52.3 49.7 |
| Comp. 3 | 10% F-815 | Kraton Acrylate | 33.9 9.0 | 1.8 15.8 | 19.7 47.1 | 15.3 49.7 |
| Comp. | Paper w/ | Kraton | 2.0 | 0.9 | 59.1 | 45.1 |
| 4 | Sil-Off | Acrylate | 0.2 | 0.4 | 60.2 | 59.5 |

*Kraton™ 1107 (Shell)

TABLE VI

Variation in AA Content in IOA or LA Systems with 2% 5K MAUS & BP

| No. | System | Tape | Release (N/dm) 2 day RT | Release (N/dm) 2 day 65° C. | Readhesion (N/dm) 2 day RT | Readhesion (N/dm) 2 day 65° C. |
|---|---|---|---|---|---|---|
| 23 | IOA/EOTMPTA 85/15 | A | 5.1 | 8.3 | 32.2 | 26.4 |
|    |  | B | 12.9 | 17.7 | 45.8 | 46.2 |
| 24 | IOA/EOTMPTA/AA 80/15/5 | A | 4.2 | 6.4 | 34.9 | 35.5 |
|    |  | B | 14.9 | 19.7 | 45.8 | 48.4 |
| 25 | IOA/EOTMPTA/AA 75/15/10 | A | 3.9 | 6.7 | 38.8 | 32.4 |
|    |  | B | 14.9 | 19.3 | 46.6 | 47.9 |
| 26 | IOA/EOTMPTA/AA 65/15/20 | A | 2.6 | 4.8 | 32.8 | 35.0 |
|    |  | B | 12.9 | 18.8 | 51.9 | 49.3 |
| 27 | IOA/EOTMPTA/AA 55/15/30 | A | — | 5.3 | 34.0 | 35.0 |
|    |  | B | 9.6 | 11.2 | 50.6 | — |
| 28 | LA/EOTMPTA 85/15 | A | 2.5 | 3.8 | 34.3 | 30.6 |
|    |  | B | 15.3 | 17.1 | 46.0 | 45.5 |
| 29 | LA/EOTMPTA/AA 80/15/5 | A | 2.3 | 4.1 | 32.0 | 28.5 |
|    |  | B | 11.6 | 16.4 | 45.5 | 45.1 |
| 30 | LA/EOTMPTA/AA 75/15/10 | A | 2.5 | 3.6 | 36.9 | 35.3 |
|    |  | B | 12.5 | 15.8 | 43.6 | 45.3 |
| 31 | LA/EOTMPTA/AA 65/15/20 | A | 2.0 | 3.4 | 33.9 | 32.4 |
|    |  | B | 9.9 | 14.7 | 44.0 | 43.6 |
| 32 | LA/EOTMPTA/AA 55/15/30 | A | 2.5 | 4.1 | 31.7 | 35.6 |
|    |  | B | 10.7 | 16.4 | 44.2 | — |

TABLE VII

Comparison of Low Viscosity and Viscosity-Enhanced Formulations: 85/10/5 LA/EOTMPTA/AA + 4% BP

| No. | System | Tape | Release (N/dm) Imm. RT | Release (N/dm) 2 day RT | Release (N/dm) 2 day 65° C. | Readhesion (N/dm) 2 day RT | Readhesion (N/dm) 2 day 65° C. |
|---|---|---|---|---|---|---|---|
| Comp. 5 | Low visc no Sil | A | 8.5 | 20.3 | 18.7 | — | 29.0 |
|   |  | B | 22.8 | 33.1 | 28.9 | 43.1 | 49.5 |
| 33 | Low visc 0.2% Sil | A | 1.6 | — | — | 33.4 | 30.3 |
|   |  | B | 9.0 | — | 20.8 | 49.5 | 50.1 |
| 34 | Low visc 0.5% Sil | A | 1.0 | 3.4 | 3.6 | 35.7 | 28.3 |
|   |  | B | 2.8 | 11.6 | 17.5 | 44.4 | 51.7 |
| 35 | Low visc 1.0% Sil | A | 0.7 | 3.4 | 4.8 | 29.3 | 29.0 |
|   |  | B | 6.3 | 15.3 | 21.2 | 50.6 | 51.4 |
| Comp. 6 | High visc no Sil | A | 7.4 | 16.9 | 22.5 | 25.8 | 31.4 |
|   |  | B | 28.7 | 37.4 | >44.0 | 43.1 | — |
| 36 | High visc 0.2% Sil | A | 1.5 | 4.5 | 6.7 | 36.2 | 30.8 |
|   |  | B | 6.8 | 17.5 | 21.5 | 47.5 | 53.6 |
| 37 | High visc | A | 1.0 | 3.1 | 7.0 | 29.9 | 28.7 |

TABLE VII-continued

Comparison of Low Viscosity and Viscosity-Enhanced Formulations: 85/10/5 LA/EOTMPTA/AA + 4% BP

| No. | System | Tape | Release (N/dm) Imm. RT | Release (N/dm) 2 day RT | Release (N/dm) 2 day 65° C. | Readhesion (N/dm) 2 day RT | Readhesion (N/dm) 2 day 65° C. |
|---|---|---|---|---|---|---|---|
|    | 0.5% Sil  | B | 9.6 | 14.4 | 21.5 | 45.5 | 50.3 |
| 38 | High visc | A | 0.9 | 2.9  | 5.7  | 31.8 | 27.7 |
|    | 1.0% Sil  | B | 2.4 | 13.8 | 19.5 | 45.5 | 50.8 |

TABLE VIII

Mixtures of IOA/LA

| No. | LA/IOA ratio | Silicone % MW MAUS | Tape | Release (N/dm) Imm. RT | 2 day RT | 2 day 65° C. |
|---|---|---|---|---|---|---|
| 39 | 3/1 | 0.20% 5K | A | 0.9 | 2.9 | 5.3 |
|    |     |          | B | 2.4 | 13.6 | 21.2 |
| 40 | 3/1 | 0.40% 5K | A | 0.6 | 2.6 | 3.5 |
|    |     |          | B | 1.1 | 9.4 | 16.2 |
| 41 | 3/1 | 0.20% 5K | A | 0.6 | 1.5 | 2.8 |
|    |     |          | B | 0.7 | 6.8 | 11.8 |
| 42 | 3/1 | 0.40% 10K | A | 0.4 | 1.6 | 2.9 |
|    |     |           | B | 0.7 | 8.3 | 15.5 |
| 43 | 1/1 | 0.20% 5K | A | 0.7 | 1.8 | 5.8 |
|    |     |          | B | 3.5 | 9.9 | 23.9 |
| 44 | 1/1 | 0.40% 5K | A | 0.6 | 3.1 | 6.6 |
|    |     |          | B | 0.4 | 9.4 | 17.5 |
| 45 | 1/1 | 0.20% 10K | A | 0.4 | 1.8 | 3.1 |
|    |     |           | B | 1.1 | 5.7 | 14.4 |
| 46 | 1/1 | 0.40% 10K | A | 0.4 | 1.6 | 2.8 |
|    |     |           | B | 0.6 | 3.5 | 8.3 |

TABLE IX

ODA/LA/EOTMPTA (A) or ODA/IOA/TMPTA (B) Formulations

| No. | Form. | Silicone 12K MAUS wt % | Tape | Release (N/dm) Imm. RT | 2 day RT | 2 day 65° C. |
|---|---|---|---|---|---|---|
| Comp. 7 | (B) | none | A | 2.2 | 11.2 | 17.9 |
| 47 | (B) | 2% | A | 0.4 | 1.5 | 4.4 |
| 48 | (B) | 4% | A | 0.4 | 2.6 | 2.9 |
| Comp. 8 | (A) | none | A | 2.0 | 7.6 | 11.2 |
| 49 | (A) | 2% | A | 0.4 | 2.5 | 2.6 |
| 50 | (A) | 4% | A | 0.4 | 1.8 | 2.6 |

TABLE X

EHA/HDDA (A) or EHA/TMPTA/HDDA (B) Formulations

| No. | Form. | Silicone wt % MW ACMAS | Tape | Release (N/dm) Imm. RT | 2 day RT | 2 day 65° C. | Readhesion (N/dm) 2 day RT | 2 day 65° C. |
|---|---|---|---|---|---|---|---|---|
| 51 | (A) | 0.60% 10K | C | 1.3 | 4.0 | 8.4 | 19.4 | 17.2 |
| 52 | (A) | 2.00% 10K | C | 0.9 | 3.9 | 8.3 | 21.0 | 16.4 |
| 53 | (A) | 5.00% 5K  | C | 0.8 | 3.8 | 8.9 | 18.4 | 16.7 |
| 54 | (B) | 0.60% 5K  | C | 2.7 | 8.6 | 10.0 | 19.2 | 18.5 |
| 55 | (B) | 2.00% 5K  | C | 1.8 | 5.1 | 8.9 | 21.0 | 17.2 |
| 56 | (B) | 5.00% 5K  | C | 1.8 | 5.6 | 9.5 | 21.2 | 16.5 |

TABLE XI

| No. | Tape | Release * (N/dm) Imm. RT | 2 day RT | 2 day 65° C. |
|---|---|---|---|---|
| 57 | D | 7.7 | 29.8 | 33.4 sh |
| 58 | D | 14.3 | 19.6 slsh | 9.3 sh |
| 59 | D | 25.3 | 28.1 slsh | 13.5 sh |
| 60 | D | 5.5 | 15.3 | 12.6 sh |
| 61 | D | 16.8 sh | 40.3 | 38.8 sh |
| 62 | D | 18.4 sh | 21.8 sh | 25.2 sh |
| 63 | C | 1.3 | 3.8 | 9.1 |
| 64 | C | 0.9 | 3.6 | 11.2 |
| 65 | C | 0.9 | 4.1 | 10.8 |
| 66 | C | 0.9 | 4.1 | 10.5 |

* sh = shocky; slsh = slightly shocky

TABLE XII

| No. | Tape | Release (N/dm) Imm. RT | 2 day RT | 2 day RT | Readhesion (N/dm) 2 day RT | 2 day 65° C. |
|---|---|---|---|---|---|---|
| 67 | D | 21.5 | 28.9 | — | — | 144.3 |
| 68 | D | 12.5 | 19.1 | 23.1 | 130.0 | 151.1 |
| 69 | D | 20.6 | 14.0 | 9.5 | 137.4 | 147.7 |
| 70 | D | 12.3 | 18.1 | 18.3 | 131.9 | — |
| 71 | D | 9.5 | 11.5 | 16.0 | 140.6 | 141.7 |
| 72 | D | 24.2 | 23.3 | 9.6 | 128.7 | 150.6 |

TABLE XIII

| No. | Tape | Release (N/dm) Imm. RT | 2 day RT | 2 day RT | Readhesion (N/dm) 2 day RT | 2 day 65° C. |
|---|---|---|---|---|---|---|
| 73 | C | 2.4 | 6.6 | 10.3 | 15.9 | 15.2 |
| Comp. 9 | C | 1.2 | 4.6 | 15.8 | 15.7 | 15.2 |
| Comp. 10 | C | 1.0 | 7.8 | 18.5 | 14.6 | 14.5 |
| Comp. 11 | C | 1.0 | 4.4 | 14.3 | 16.4 | 14.3 |

TABLE XIV

| No. | Tape | Release (N/dm) 2 day RT | 2 day 65° C. |
|---|---|---|---|
| 74 | E | 4.6 | 6.7 |
| 75 | E | 4.1 | 7.2 |
| 76 | E | 6.0 | 8.0 |
| 77 | E | 5.4 | 7.8 |
| Comp. 12 | E | 42.7 | 40.6 |

TABLE XV

High Levels of HDDA - 0.5% 4K ACMAS

| No. | IOA/HDDA | Tape | Release (N/dm) Imm. RT | 2 day RT | 2 day 65° C. | Readhesion (N/dm) 2 day RT | 2 day 65° C. |
|---|---|---|---|---|---|---|---|
| 78 | 70/30 | A | 0.9 | 3.4 | 3.9 | 34.7 | 37.8 |
|  |  | F | 5.5 | 14.3 | 20.9 | 43.8 | 42.5 |
| 78 | Immed. Lamin. | A | | 4.2 | 5.7 | 35.0 | 39.0 |
|  |  | F | | 16.6 | 22.2 | 42.6 | 45.2 |
| 79 | 60/40 | A | 0.6 | 2.8 | 4.5 | 38.5 | 35.9 |
|  |  | F | 4.7 | 19.1 | 18.5 | 46.3 | 46.4 |
| 79 | Immed. Lamin. | A | | 4.5 | 6.1 | 37.4 | 38.2 |
|  |  | F | | 13.1 | 17.9 | 44.9 | 44.4 |
| 80 | 50/50 | A | 0.7 | 2.5 | 4.2 | 35.7 | 38.8 |
|  |  | F | 3.4 | 10.8 | 15.0 | 48.3 | 47.7 |
| 81 | 40/60 | A | 0.7 | 2.9 | 4.5 | 40.6 | 29.6 |
|  |  | F | 2.8 | 9.8 | 16.2 | 46.8 | 48.7 |
| 82 | 35/65 | A | 0.7 | 4.7 | 7.0 | 39.1 | 40.0 |
|  |  | F | 6.9 | 18.2 | 22.2 | 44.5 | 46.0 |
| 83 | 30/70 | A | 0.7 | 5.4 | 8.9 | 36.3 | 43.3 |
|  |  | F | 6.6 | 11.8 | 20.7 | 46.8 | 49.5 |

TABLE XVI

| No. | Tape | Release (N/dm) Imm. RT | 2 day RT | 2 day 65° C. | Readhesion (N/dm) 2 day RT | 2 day 65° C. |
|---|---|---|---|---|---|---|
| 84 | A | 0.6 | 2.5 | 2.3 | 32.0 | 31.8 |
|  | F | 1.2 | 14.7 | 19.7 | 45.4 | 47.4 |
| 85 | A | 1.0 | 3.8 | 9.0 | 36.3 | 38.2 |
|  | F | 7.1 | 23.3 | 24.1 | 44.6 | 46.0 |
| 86 | A | 1.3 | 8.6 | 14.3 | 42.3 | 42.3 |
|  | F | 2.3 | 15.6 | 13.7 | 45.4 | 48.3 |
| 87 | A | 0.7 | 4.4 | 5.4 | 39.0 | 37.6 |
|  | F | 3.2 | 12.3 | 16.5 | 46.3 | 48.6 |
| 88 | A | 0.9 | 2.3 | 6.4 | 32.4 | 37.1 |
|  | F | 1.2 | 9.3 | 13.9 | 46.7 | 45.5 |

TABLE XVII

| No. | Sub. | Coating Thickness (Å) | Tape | Release (N/dm) Imm. RT | 2 day RT | 2 day 65° C. | Readhesion (N/dm) 2 day RT | 2 day 65° C. |
|---|---|---|---|---|---|---|---|---|
| Comp. 13 | BOPP | 2000 | F | 57.5 | 58.4 | 59.4 | 48.1 | 46.7 |
|  | BOPP | 2000 | A | 14.2 | 29.9 | 33.4 | 33.6 | 35.0 |
|  | PET | 1000 | F | 55.9 | 63.3 | 65.7 | 51.1 | 51.0 |
|  | PET | 1000 | A | 20.3 | 35.0 | 33.0 | 35.0 | 32.0 |
|  | PET | 1000 | G | 32.1 | 37.9 | 40.3 | 42.7 | 42.7 |
|  | PET | 2000 | F | 55.9 | 63.9 | 64.3 | 51.1 | 51.1 |
|  | PET | 2000 | A | 16.0 | 33.0 | 29.6 | 30.6 | 35.0 |
|  | PET | 2000 | G | 34.2 | 42.0 | 42.2 | 42.7 | 41.6 |
| 89 | BOPP | 2000 | F | 44.4 | 50.6 | 53.7 | 46.7 | 46.7 |
|  | BOPP | 2000 | A | 10.2 | 26.1 | 27.3 | 32.1 | 35.0 |
|  | PET | 1000 | F | 52.1 | 58.4 | 62.4 | 51.1 | 49.6 |
|  | PET | 1000 | A | 15.8 | 25.5 | 26.4 | 30.6 | 27.7 |
|  | PET | 1000 | G | 29.9 | 36.2 | 36.8 | 43.8 | 41.6 |
|  | PET | 2000 | F | 43.3 | 55.4 | 59.2 | 49.6 | 51.1 |
|  | PET | 2000 | A | 12.5 | 25.5 | 25.2 | 27.7 | 26.3 |
|  | PET | 2000 | G | 27.4 | 34.6 | 37.7 | 43.8 | 39.4 |
| 90 | BOPP | 2000 | F | 38.2 | 48.3 | 49.9 | 48.1 | 49.6 |
|  | BOPP | 2000 | A | 7.6 | 20.7 | 25.4 | 32.1 | 33.6 |
|  | PET | 1000 | F | 40.6 | 55.7 | 61.7 | 49.6 | 49.6 |
|  | PET | 1000 | A | 10.1 | 26.8 | 23.8 | 32.1 | 33.6 |
|  | PET | 1000 | G | 26.3 | 34.5 | 35.6 | 41.6 | 41.6 |
|  | PET | 2000 | F | 38.2 | 49.3 | 56.8 | 48.2 | 49.6 |
|  | PET | 2000 | A | 7.4 | 19.7 | 20.7 | 33.6 | 35.0 |
|  | PET | 2000 | G | 21.6 | 26.7 | 26.4 | 49.3 | 46.0 |
| 91 | BOPP | 2000 | F | 28.6 | 29.8 | 37.4 | 45.3 | 48.1 |
|  | BOPP | 2000 | A | 2.9 | 8.3 | 11.5 | 33.6 | 35.0 |
|  | PET | 1000 | F | 39.5 | 49.2 | 54.0 | 49.6 | 49.6 |
|  | PET | 1000 | A | 7.4 | 18.8 | 21.4 | 29.2 | 36.5 |
|  | PET | 1000 | G | 18.9 | 24.5 | 23.8 | 47.1 | 46.0 |
|  | PET | 2000 | F | 27.3 | 35.3 | 42.3 | 46.7 | 49.6 |
|  | PET | 2000 | A | 2.3 | 7.6 | 9.5 | 36.5 | 37.9 |
|  | PET | 2000 | G | 7.7 | 11.7 | 11.7 | 55.8 | 52.6 |
| 92 | BOPP | 2000 | F | 6.6 | 8.3 | 18.5 | 52.5 | 49.6 |
|  | BOPP | 2000 | A | 1.0 | 1.9 | 7.3 | 39.4 | 33.6 |
|  | PET | 1000 | F | 4.7 | 9.2 | 15.6 | 49.6 | 51.1 |
|  | PET | 1000 | A | 1.0 | 1.5 | 3.6 | 35.0 | 26.3 |
|  | PET | 1000 | G | 0.8 | 2.0 | 3.4 | 53.7 | 42.7 |
|  | PET | 2000 | F | 6.1 | 12.0 | 18.5 | 55.4 | 51.1 |
|  | PET | 2000 | A | 0.7 | 1.3 | 2.2 | 39.4 | 30.6 |
|  | PET | 2000 | G | 1.8 | 2.3 | 3.6 | 56.9 | 53.7 |
| 93 | BOPP | 2000 | F | 2.0 | 3.8 | 8.2 | 52.5 | 51.1 |
|  | BOPP | 2000 | A | 0.7 | 1.5 | 2.9 | 35.0 | 33.6 |
|  | PET | 1000 | F | 4.8 | 11.1 | 16.2 | 54.0 | 51.1 |
|  | PET | 1000 | A | 1.0 | 1.5 | 3.4 | 26.3 | 30.6 |
|  | PET | 1000 | G | 1.8 | 2.4 | 3.8 | 54.8 | 49.3 |
|  | PET | 2000 | F | 1.8 | 3.6 | 7.4 | 54.0 | 54.0 |

TABLE XVII-continued

| No. | Sub. | Coating Thickness (Å) | Tape | Release (N/dm) Imm. RT | Release (N/dm) 2 day RT | Release (N/dm) 2 day 65° C. | Readhesion (N/dm) 2 day RT | Readhesion (N/dm) 2 day 65° C. |
|---|---|---|---|---|---|---|---|---|
| | PET | 2000 | A | 0.8 | 1.5 | 2.8 | 26.3 | 27.7 |
| | PET | 2000 | G | 1.1 | 2.6 | 6.6 | 55.8 | 49.3 |

TABLE XVIII

Release Results for BOPP Electrosprayed at 2000 Å

| No. | Tape | Release (N/dm) Imm. RT | Release (N/dm) 2 day RT | Release (N/dm) 2 day 65° C. | Readhesion (N/dm) 2 day RT | Readhesion (N/dm) 2 day 65° C. |
|---|---|---|---|---|---|---|
| 94 | A | 3.1 | 16.0 | 16.8 | 42.3 | 39.4 |
| | G | 10.5 | 20.9 | 20.8 | 50.4 | 48.2 |
| | F | 23.1 | 37.4 | 39.8 | 45.2 | 45.2 |
| | I | 1.5 s | 7.4 s | 6.1 s | 96.4 | 21.9 s |
| 95 | A | 1.2 | 4.7 | 6.3 | 35.0 | 37.9 |
| | G | 2.7 | 6.4 | 72.0 | 54.8 | 50.4 |
| | F | 12.0 | 19.7 | 24.5 | 45.2 | 46.7 |
| | I | 1.4 s | 2.8 s | 3.2 s | 79.9 | 3.4 s |
| 96 | A | 0.7 | 4.7 | 4.5 | 42.3 | 43.8 |
| | G | 1.9 | 8.5 | 9.4 | 59.1 | 50.4 |
| | F | 5.3 | 10.5 | 15.0 | 46.7 | 48.1 |
| | I | 1.5 s | 2.5 s | 1.2 s | 70.1 s | 5.5 s |
| 97 | A | 0.9 | 3.5 | 6.6 | 45.2 | 43.8 |
| | G | 2.6 | 9.3 | 12.3 | 55.8 | 52.6 |
| | F | 4.2 | 14.7 | 16.8 | 46.7 | 49.6 |
| | I | 1.3 s | 2.5 s | 3.2 s | 89.8 | 9.9 s |
| 98 | A | 1.2 | 5.3 | 8.9 | 45.2 | 45.2 |
| | G | 2.9 | 10.8 | 13.2 | 58.0 | 52.6 |
| | F | 8.0 | 16.5 | 22.0 | 45.2 | 46.7 |
| | I | 1.4 s | 3.5 s | 3.9 s | 88.7 | 13.1 s |
| Comp. 14 | A | 1.9 | 16.5 | 19.1 | 21.9 | 23.3 |
| | G | 5.0 | 16.1 | 14.6 | 35.0 | 31.8 |
| | F | 11.1 | 24.9 | 28.6 | 35.0 | 35.0 |
| | I | 1.9 s | 4.5 s | 3.7 s | 28.5 s | 6.6 s | s = shocky

TABLE XIX

| No. | Coating Thickness (Å) | Tape | Release (N/dm) Imm. RT | Release (N/dm) 2 day RT | Release (N/dm) 2 day 65° C. | Readhesion (N/dm) 2 day RT | Readhesion (N/dm) 2 day 65° C. |
|---|---|---|---|---|---|---|---|
| Comp. 15 | | H | 8.9 | 12.1 | 9.2 | 7.6 | 6.6 |
| 99 | 1000 | H | 1.9 | 4.2 | 6.3 | 7.4 | 6.6 |
| | 1500 | H | 1.8 | 4.1 | 5.7 | 8.8 | 7.6 |
| | 2000 | H | 3.4 | 6.7 | 7.6 | 7.9 | 6.7 |
| 100 | 1000 | H | 3.1 | 5.0 | 7.1 | 8.3 | 6.3 |
| | 1500 | H | 2.3 | 5.0 | 5.7 | 8.3 | 7.0 |
| | 2000 | H | 2.6 | 7.4 | 8.9 | 7.7 | 7.4 |

TABLE XX

| No. | Tape | Release (N/dm) Imm. RT | Release (N/dm) 2 day RT | Release (N/dm) 2 day 65° C. | Readhesion (N/dm) 2 day RT | Readhesion (N/dm) 2 day 65° C. |
|---|---|---|---|---|---|---|
| 101 | I | 6.5 | 9.7 | 10.6 | 65.8 | — |
| 102 | G | 18.2 | 18.7 | 18.4 | 49.2 | 46.1 |
| | I | 3.3 | 7.8 | 9.0 | 63.7 | 70.5 |
| | G | 7.8 | 5.8 | 7.1 | 52.0 | 53.7 |

TABLE XXI

| No. | Transfer to Pickup Speed Ratio | Tape | Release (N/dm) Imm. RT | Readhesion (N/dm) Imm. RT |
|---|---|---|---|---|
| 103 | 8/1 | I | 2.2 | 81.0 |
| | 10/1 | I | 3.3 | 82.1 |
| | 13/1 | I | 5.5 | 86.5 |
| | 15/1 | I | 10.1 | 89.8 |

While this invention has been described in connection with specific embodiments, it should be understood that it is capable of further modification. The claims herein are intended to cover those variations which one skilled in the art would recognize as the chemical equivalent of what has been described here.

What is claimed is:

1. A radiation curable release coating composition comprising:

(a) from about 0.05 to about 25 percent by weight of polymer selected from the group consisting of polymers falling within the general formula:

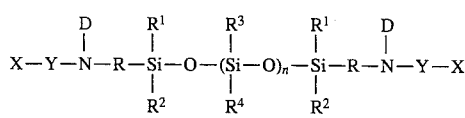

and mixtures thereof, wherein:
X are monovalent moieties having ethylenic unsaturation which can be the same or different;
Y are divalent linking groups which can be the same or different;
D are monovalent moieties which can be the same or different selected from the group consisting of hydrogen, an alkyl group of 1 to about 10 carbon atoms, and aryl;
R are divalent hydrocarbon groups which can be the same or different;
$R^1$ are monovalent moieties which can be the same or different selected from the group consisting of alkyl and aryl;
$R^2$ are monovalent moieties which can be the same or different selected from the group consisting of alkyl and aryl;
$R^3$ are monovalent moieties which can be the same or different selected from the group consisting of alkyl, vinyl, and aryl;
$R^4$ are monovalent moieties which can be the same or different selected from the group consisting of alkyl, vinyl, and aryl; and
n is an integer of about 25 to about 750;
(b) from about 5 to about 60 percent by weight of one or more multi-functional free radically polymerizable vinyl monomers copolymerizable with said polymer; and
(c) from about 25 to about 95 percent by weight of one or more monofunctional free radically polymerizable vinyl monomers copolymerizable with said polymer;
wherein said weight percentages are based upon the total weight of said radiation curable release coating composition.

2. The composition of claim 1 wherein X comprises

wherein $R^5$ is selected from the group consisting of hydrogen and —COOH and $R^6$ is selected from the group consisting of hydrogen, methyl, and —CH$_2$COOH, n is an integer of about 50 to about 270, R is selected from the group consisting of alkylene of one to about 12 carbon atoms, alkylarylene, and arylene, $R^1$ and $R^2$ are independently selected from the group consisting of alkyl of one to about 12 carbon atoms and aryl, $R^3$ and $R^4$ are at least 50% methyl wherein any remaining $R^3$ and $R^4$ groups are independently selected from the group consisting of alkyl of about 2 to about 12 carbon atoms, vinyl, and aryl, and D is hydrogen.

3. The composition of claim 1 which further comprises about 0.1 to about 5 weight percent of a free radical initiator based upon the total weight of said radiation curable release coating composition.

4. The composition of claim 1 wherein X comprises

Y comprises

D=H; R comprises —CH$_2$CH$_2$CH$_2$—; and $R^1$, $R^2$, $R^3$ and $R^4$ each comprise —CH$_3$.

5. The composition of claim 1 wherein X comprises CH$_2$=CH—; Y comprises

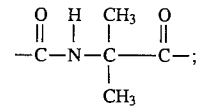

D=H; R comprises —CH$_2$CH$_2$CH$_2$—; and $R^1$, $R^2$, $R^3$ and $R^4$ each comprise —CH$_3$.

6. The composition of claim 1 wherein X comprises CH$_2$=CH—, Y comprises

D=H, R comprises —CH$_2$CH$_2$CH$_2$—; and $R^1$, $R^2$, $R^3$ and $R^4$ each comprise —CH$_3$.

7. The composition of claim 1 wherein X comprises

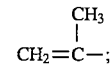

Y comprises

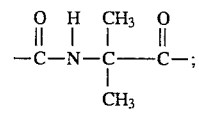

D=; R comprises —CH$_2$CH$_2$CH$_2$—; and $R^1$, $R^2$, $R^3$ and $R^4$ each comprise —CH$_3$.

8. The composition of claim 1 wherein X comprises

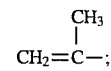

Y comprises

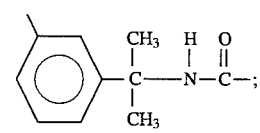

D=H; R comprises —CH$_2$CH$_2$CH$_2$—; , $R^1$, $R^2$, $R^3$, and $R^4$ each comprise —CH$_3$.

9. The composition of claim 1 wherein said monofunctional free radically polymerizable vinyl monomer is selected from the group consisting of styrene, butyl acrylate, hexyl acrylate, benzyl acrylate, cyclohexyl acrylate, isobornyl acrylate, 2-ethoxyethyl acrylate, isooctyl acrylate, isononyl acrylate, isodecyl acrylate, lauryl acrylate, 2-ethylhexyl acrylate, octadecyl acrylate, butyl methacrylate, isobornyl methacrylate, isooctyl methacrylate, tetrahydrofurfuryl acrylate, and mixtures thereof.

10. The composition of claim 1 wherein said monofunctional free radically polymerizable vinyl monomer comprises about 50 to about 100 mole percent acrylic monomer.

11. The composition of claim 1 wherein said monofunctional free radically polymerizable vinyl monomer comprises monomer selected from the group consisting of acrylates of non-tertiary alcohols comprising from about 4 to about 12 carbon atoms.

12. The composition of claim 1 wherein said monofunctional free radically polymerizable vinyl monomer is selected from the group consisting of cyclohexyl acrylate, isobornyl acrylate, isooctyl acrylate, 2-ethylhexyl acrylate, lauryl acrylate, and mixtures thereof.

13. The composition of claim 1 wherein about 5 to about 15 percent of said monofunctional free radically polymerizable vinyl monomer comprises polar monomer.

14. The composition of claim 1 wherein said multifunctional free radically polymerizable vinyl monomer is selected from the group consisting of divinyl benzene, and acrylates, methacrylates, and beta-acryloxypropionates of 1,6-hexanediol, trimethylolpropane, 1,4-butanediol, triethylene glycol, tetraethylene glycol, pentaerythritol, their ethoxylated and propoxylated analogs, and mixtures thereof.

15. The composition of claim 1 wherein said multifunctional free radically polymerizable monomer is selected from the group consisting of acrylates of 1,6-hexanediol, trimethylolpropane, their ethoxylated and propoxylated analogs, and mixtures thereof.

16. The composition of claim 1 which comprises about 0.2 to about 10 weight percent of said polymer, about 5 to about 35 weight percent of said free radically polymerizable multifunctional vinyl monomer, and from about 55 to about 95 percent by weight of said free radically polymerizable monofunctional vinyl monomer.

17. A sheet coated on at least a portion of at least one major surface thereof with the composition of claim 1.

18. A sheet coated on at least a portion of at least one major surface thereof with the cured composition of claim 1.

19. The composition of claim 1 which further comprises at least one additive selected from the group consisting of flatting agent, pigment, solvent, and conductivity enhancer.

20. The composition of claim 2 wherein n is an integer of about 50 to about 200, R is alkylene of one to about 12 carbon atoms, and $R^1$, $R^2$, $R^3$, and $R^4$ are methyl.

21. The composition of claim 3 wherein said free radical initiator is selected from the group consisting of benzoin ethers, benzophenone, derivatives of benzophenone, acetophenone derivatives, camphorquinone, and mixtures thereof.

22. The composition of claim 13 wherein said polar monomer is selected from the group consisting of acrylic acid, N-vinyl pyrrolidone, hydroxyethyl acrylate, methacrylic acid, and mixtures thereof.

23. The composition of claim 16 which comprises about 10 to about 30 weight percent of said free radically polymerizable multifunctional vinyl monomer.

24. The sheet of claim 22 wherein said composition has been coated onto said sheet via an electrospray process prior to curing.

* * * * *

UNITED STATES PATENT AND TRADEMARK OFFICE
CERTIFICATE OF CORRECTION

PATENT NO. : 5,527,578
DATED : June 18, 1996
INVENTOR(S) : Mieczyslaw H. Mazurek, Steven S. Kantner, and Albert I. Everaerts It is certified that error appears in the above-identified patent and that said Letters Patent is hereby corrected as shown below:

Column 34, line 38, "D=;" should read --D=H;--

Signed and Sealed this

Twenty-seventh Day of July, 1999

Attest:

Q. TODD DICKINSON

*Attesting Officer*    *Acting Commissioner of Patents and Trademarks*